US008796357B2

(12) United States Patent
Hironaka

(10) Patent No.: US 8,796,357 B2
(45) Date of Patent: Aug. 5, 2014

(54) INK COMPOSITION, IMAGE FORMING METHOD, AND PRINT MATERIAL

(75) Inventor: Koji Hironaka, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 118 days.

(21) Appl. No.: 13/420,291

(22) Filed: Mar. 14, 2012

(65) Prior Publication Data
US 2012/0238691 A1 Sep. 20, 2012

(30) Foreign Application Priority Data

Mar. 15, 2011 (JP) ................................. 2011-057311

(51) Int. Cl.
C08J 7/18 (2006.01)
C09D 11/10 (2014.01)
C08L 29/12 (2006.01)
C08L 39/00 (2006.01)
C08L 41/00 (2006.01)

(52) U.S. Cl.
USPC ........... 523/160; 524/555; 524/592; 524/609; 347/100; 427/511

(58) Field of Classification Search
USPC ........................................... 522/14, 904, 905
See application file for complete search history.

(56) References Cited

U.S. PATENT DOCUMENTS

| 6,177,144 | B1 * | 1/2001 | Kranig et al. ................. 427/519 |
| 2009/0197056 | A1 * | 8/2009 | Yokoi et al. ................. 428/195.1 |
| 2010/0227076 | A1 | 9/2010 | Yokoi et al. |
| 2011/0195198 | A1 * | 8/2011 | Loccufier et al. ............. 427/532 |

FOREIGN PATENT DOCUMENTS

| EP | 1 674 499 A1 | 6/2006 |
| EP | 2 130 817 A1 | 12/2009 |
| EP | 2 130 818 A1 | 12/2009 |
| EP | 2 161 264 A1 | 3/2010 |
| JP | 2006-28516 A | 2/2006 |
| JP | 2010209183 A | 9/2010 |
| WO | 2010/133381 A1 | 11/2010 |

OTHER PUBLICATIONS

Extended European Search Report dated Jun. 11, 2012 issued in corresponding European Patent Application No. 12159440.2, 5 pages.
Notice of Reasons for Rejection, dated Jun. 4, 2013, issued in corresponding JP Application No. 2011-057311, 7 pages in English and Japanese.

* cited by examiner

*Primary Examiner* — Vu A Nguyen
(74) *Attorney, Agent, or Firm* — Sughrue Mion, PLLC

(57) ABSTRACT

Provided is an ink composition capable of forming images having excellent water resistance, excellent solvent resistance and excellent adhesiveness to base materials, the ink composition including (Component A) a polymer containing a repeating unit (a1) having at least one of an aromatic ketone structure and an aliphatic 1,2-diketone structure, a repeating unit (a2) having at least one of a tertiary amine structure and a thiol structure, and a repeating unit (a3) having an ethylenically unsaturated double bond, and (Component B) a coloring material.

7 Claims, No Drawings

INK COMPOSITION, IMAGE FORMING METHOD, AND PRINT MATERIAL

BACKGROUND OF THE INVENTION

1. Field of the Invention

The present invention relates to an ink composition, an image forming method, and a print material.

2. Description of the Related Art

As an image recording method of forming an image on a recording medium such as paper based on image data signals, an electrophotographic system, sublimation type and melt type heat transfer systems, an inkjet recording system, and the like are available. Among the ink compositions used in the recording of images by an inkjet system, active energy radiation-curable aqueous inks can be suitably used in the printing of images, pretreatments for imparting print suitability to a recording medium, post-treatment for protection and decoration of printed images, and the like. Furthermore, since active energy radiation-curable aqueous inks contain water as a main component, the inks have many excellent features and possibilities such as excellent safety, and applicability to high-density inkjet recording as a result of a decrease in viscosity.

A significantly large number of commercially available active energy radiation-curable inks contain low molecular weight photoinitiators and low molecular weight co-initiators. However, if these initiators are not incorporated into the polymer matrix after the irradiation of an active energy radiation, the initiators may easily bleed out from the cured product. Thus, from the viewpoint of safety, there are demands for suppression of such bleed-out.

As one of the methods for solving these problems, an increase in the molecular weight of the initiator may be used. However, when a cleavage type initiator is used, there are occasions in which an initiator which has been cleaved and has its molecular weight reduced may remain without reacting with polymerizable compounds. On the other hand, when a Norrish II type initiator which interacts with a second molecule while being in an excited state, and generates a radical in a two-molecule reaction, is used as a photoinitiator after an increase in the molecular weight, since the initiator does not undergo a molecular weight reduction, a cured product in which a low molecular weight product does not remain can be obtained. An example of a composition containing a high molecular weight Norrish II type initiator is the ink composition described in JP 2006-28516 A.

SUMMARY OF THE INVENTION

The ink composition described in JP 2006-28516 A can be easily produced and has high curability, but there is still room for an improvement in the technology described in JP 2006-28516 A in terms of water resistance, solvent resistance, and adhesiveness. That is, there is a strong demand for an ink composition having satisfactory water resistance, solvent resistance and adhesiveness.

A problem to be solved by the present invention is to provide an ink composition which produces a recorded image having excellent water resistance, excellent solvent resistance, and excellent adhesiveness to a base material.

The ink composition of the present invention that can solve the problem described above includes (Component A) a polymer containing a repeating unit (a1) having at least one of an aromatic ketone structure and an aliphatic 1,2-diketone structure, a repeating unit (a2) having at least one of a tertiary amine structure and a thiol structure, and a repeating unit (a3) having an ethylenically unsaturated double bond; and (Component B) a coloring material.

According to the present invention, the ink composition further includes (Component C) an organic solvent, while according to a preferred embodiment, the content of the (Component C) in the ink composition is 5 mass % to 95 mass %, and particularly, the content of the (Component C) in the ink composition is 40 mass % to 90 mass %.

Furthermore, according to the present invention, the ink composition further includes (Component D) water, while according to a preferred embodiment, the content of the (Component D) in the ink composition is 5 mass % to 95 mass %, and particularly, the content of the (Component D) in the ink composition is 40 mass % to 90 mass %.

Also, according to the present invention, the (Component A) further contains a repeating unit (a4) having a water-soluble group, while according to a preferred embodiment, the water-soluble group is at least one group selected from the group consisting of a carboxyl group, a sulfo group, a phosphate group, a phosphonate group and salts thereof, a quaternary ammonium salt, a residue obtained by excluding one hydrogen atom from a heterocyclic compound containing a nitrogen atom or an oxygen atom, an amide group, a carbamoyl group, an alcoholic hydroxyl group, and a group having a polyalkyleneoxy structure.

According to the present invention, the repeating unit (a1) of the (Component A) is a repeating unit having an aromatic ketone structure, while according to a preferred embodiment, the repeating unit (a2) of the (Component A) is a repeating unit having a tertiary amine structure, and the repeating unit (a3) of the (Component A) is a repeating unit having a (meth)acryloyloxy group and/or a (meth)acrylamide group.

According to the present invention, it is a preferred embodiment that the ink composition is intended for inkjet recording.

The present invention also includes an image forming method including an ink applying step of applying the ink composition described above to a recording medium, and an irradiation step of irradiating the applied ink composition with an active energy radiation.

According to the present invention, it is a preferred embodiment that the ink applying step is a step of applying the ink composition by an inkjet method.

The present invention also includes a print material recorded according to the image forming method described above.

According to the present invention, an aqueous ink composition capable of forming an image that is excellent in solvent resistance, water resistance and adhesiveness to a base material can be provided.

DESCRIPTION OF THE PREFERRED EMBODIMENTS

<<Ink Composition>>

In the present invention, the inventors have succeeded in obtaining an ink composition capable of forming an image that is excellent water resistance, solvent resistance and adhesiveness to a base material, by using (Component A) a polymer containing a repeating unit (a1) having at least one of an aromatic ketone structure and an aliphatic 1,2-diketone structure, a repeating unit (a2) having at least one of a tertiary amine structure and a thiol structure, and a repeating unit (a3) having an ethylenically unsaturated double bond; and (Component B) a coloring material.

The mechanism of the present invention is not clearly known, but the inventors speculate the mechanism to be as follows. The ink composition of the present invention can suppress the generation of low molecular weight substances in the cured product of the ink composition. Furthermore, in the ink composition of the present invention, the cured product of the ink composition is not plasticized by low molecular weight products. In addition, since the ink composition of the present invention contains a polymerizable group in the (Component A), stronger films can be formed, and the ink composition has enhanced water resistance and the like.

Hereinafter, the ink composition of the present invention will be described in detail.

The present invention is an ink composition characterized by containing (Component A) and (Component B) described below:

(Component A) a polymer containing a repeating unit (a1) having at least one of an aromatic ketone structure and an aliphatic 1,2-diketone structure, a repeating unit (a2) having a tertiary amine structure and a thiol structure, and a repeating unit (a3) having an ethylenically unsaturated double bond; and (Component B) a coloring material.

<(Component A) Polymer containing repeating unit (a1) having at least one of aromatic ketone structure and aliphatic 1,2-diketone structure, repeating unit (a2) having at least one of tertiary amine structure and thiol structure, and repeating unit (a3) having ethylenically unsaturated double bond>

As the (Component A) used in the present invention, use can be made of any polymer containing a repeating unit (a1) having at least one of an aromatic ketone structure and an aliphatic 1,2-diketone structure, a repeating unit (a2) having at least one of a tertiary amine structure and a thiol structure, and a repeating unit (a3) having an ethylenically unsaturated double bond, without any limitations. Here, the repeating units (a1), (a2) and (a3) exist in the same molecule. When the (Component A) is used, a crosslinking reaction of the ink composition can be made to proceed.

From the viewpoint of dischargeability and the like when the ink composition is discharged by an inkjet method, the weight average molecular weight of the (Component A) is preferably 5,000 to 200,000, more preferably 7,000 to 100,000, even more preferably 10,000 to 50,000, and particularly preferably 10,000 to 40,000.

The weight average molecular weight is measured by gel permeation chromatography (GPC). GPC is carried out by, for example, using an HLC-8020 GPC (manufactured by Tosoh Corp.) and using TSKgel SuperHZM-H, TSK gel SuperHZ4000, and TSKgel SuperHZ200 (manufactured by Tosoh Corp, 4.6 mm ID×15 cm) as columns, and tetrahydrofuran (THF) as an eluent.

The (Component A) is not limited in its polymer structure as long as it is a polymer compound having repeating units (a1), (a2) and (a3), and polymer structures of polyacrylate, polyurethane, polyurea, polyester, polyethyleneimine, polystyrene and the like can be used. Among them, it is preferable that the (Component A) have a polyacrylate or polyurethane structure.

The repeating units (a1), (a2) and (a3) will be described below.

(Repeating unit (a1) having at least one of aromatic ketone structure and aliphatic 1,2-diketone structure)

The (Component A) used in the present invention contains a repeating unit having at least one of an aromatic ketone structure and an aliphatic 1,2-diketone structure.

It is desirable that the aromatic ketone structure contain a structure in which an aromatic group and a carbonyl group are linked, and it is desirable that the aliphatic 1,2-diketone structure contain a structure in which the aliphatic group has two carbonyl groups, and the two carbonyl groups are adjacent to each other.

The aromatic group in the aromatic ketone structure is preferably a monocyclic group. Also, the aliphatic group in the aliphatic 1,2-diketone structure is preferably a saturated hydrocarbon.

The aromatic ketone structure preferably contains an m-valent group obtained by excluding m hydrogen atoms from a compound represented by the following formula (1-A). Here, m represents an integer of 1 or greater, and m is preferably an integer from 1 to 3, and more preferably 1 or 2.

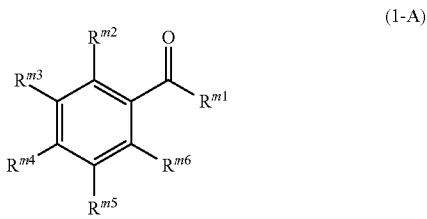

(1-A)

In the formula (1-A), $R^{m1}$ represents an alkyl group or an aryl group. When $R^{m1}$ is an alkyl group, the alkyl group may be substituted with a halogen atom, an aryl group, a hydroxyl group, a cyano group, a nitro group, an amino group, an alkylsulfanyl group, an alkylamino group, an alkoxy group, an alkoxycarbonyl group, an acyloxy group, an acyl group, a carboxyl group, a sulfo group or the like. The alkyl group may have a linear structure, a branched structure or a cyclic structure. The carbon number of the alkyl group is preferably 1 to 20, more preferably 1 to 16, and particularly preferably 1 to 12.

When $R^{m1}$ is an aryl group, the aryl group may be substituted with a halogen atom, an alkyl group, a hydroxyl group, a cyano group, a nitro group, an amino group, an alkylsulfanyl group, an alkylamino group, an alkoxy group, an alkoxycarbonyl group, an acyloxy group, an acyl group, a carboxyl group, a sulfo group or the like. The carbon number of the aryl group is preferably 6 to 20, more preferably 6 to 14, and particularly preferably 6 to 10.

In the formula (1-A), $R^{m2}$ to $R^{m6}$ each independently represent a hydrogen atom, a halogen atom, an alkyl group, an aryl group, a hydroxyl group, a cyano group, a nitro group, an amino group, an alkylsulfanyl group, an alkylamino group, an alkoxy group, an alkoxycarbonyl group, an acyloxy group, an acyl group, a carboxyl group, or a sulfo group. $R^{m2}$ to $R^{m6}$ are each independently preferably a hydrogen atom, a halogen atom, an alkyl group, a hydroxyl group, a cyano group, an alkoxy group, an alkoxycarbonyl group or a carboxyl group, and more preferably a hydroxyl group, an alkoxycarbonyl group or a carboxyl group.

Examples of the halogen atom include a fluorine atom, a chlorine atom, and a bromine atom. Among them, the halogen atom is preferably a fluorine atom or a chlorine atom.

The alkyl group is preferably a linear, branched or cyclic alkyl group having 1 to 8 carbon atoms. The alkyl group may be substituted or may not be substituted.

The aryl group is preferably an aryl group having 6 to 10 carbon atoms. The aryl group may be substituted or may not be substituted.

The alkylsulfanyl group is preferably an alkylsulfanyl group having 1 to 8 carbon atoms. The alkylsulfanyl group may be substituted or may not be substituted. The alkylamino group is preferably an alkylamino group having 1 to 8 carbon atoms. The alkylamino group may be substituted or may not be substituted.

The alkoxy group is preferably an alkoxy group having 1 to 8 carbon atoms. The alkoxy group may be substituted or may not be substituted.

The alkoxycarbonyl group is preferably an alkoxycarbonyl group having 1 to 8 carbon atoms. The alkoxycarbonyl group may be substituted or may not be substituted. The acyloxy group is preferably an acyloxy group having 1 to 8 carbon atoms. The acyloxy group may be substituted or may not be substituted.

The acyl group is preferably an acyl group having 1 to 8 carbon atoms. The acyl group may be substituted or may not be substituted.

$R^{m1}$ and $R^{m6}$ may be bonded to each other and form a ring, and the ring may be interrupted by —S— or —CO—.

The aromatic ketone structure preferably further contains an m-valent group obtained by excluding m hydrogen atoms from a compound represented by the following formula (1-A1), (1-A2) or (1-A3). m represents an integer of 1 or greater, and m is preferably an integer from 1 to 3, and more preferably 1 or 2.

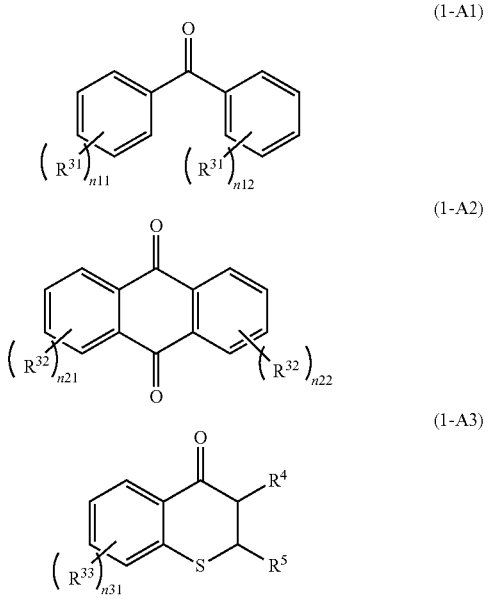

In the formulae (1-A1) to (1-A3), $R^{31}$, $R^{32}$ and $R^{33}$ each independently represent a halogen atom, an alkyl group, an aryl group, a hydroxyl group, a cyano group, a nitro group, an amino group, an alkylsulfanyl group, an alkylamino group, an alkoxy group, an alkoxycarbonyl group, an acyloxy group, an acyl group, a carboxyl group, or a sulfo group.

n11, n12, n21, n22 and n31 each independently represent an integer from 0 to 4. When $R^{31}$, $R^{32}$ and $R^{33}$ respectively exist in plural numbers, the substituents may be identical with or different from each other.

$R^4$ and $R^5$ each independently represent a hydrogen atom, a halogen atom, an alkyl group, an aryl group, a hydroxyl group, a cyano group, a nitro group, an amino group, an alkylsulfanyl group, an alkylamino group, an alkoxy group, an alkoxycarbonyl group, an acyloxy group, an acyl group, a carboxyl group, or a sulfo group. However, $R^4$ and $R^5$ may be bonded to each other and form a ring.

$R^{31}$, $R^{32}$ and $R^{33}$ each independently represent a halogen atom, an alkyl group, an aryl group, a hydroxyl group, a cyano group, a nitro group, an amino group, an alkylsulfanyl group, an alkylamino group, an alkoxy group, an alkoxycarbonyl group, an acyloxy group, an acyl group, a carboxyl group, or a sulfo group. $R^{31}$, $R^{32}$ and $R^{33}$ are each independently preferably a halogen atom, an alkyl group, a hydroxyl group, a cyano group, an alkoxy group, an alkoxycarbonyl group, or a carboxyl group, and more preferably a hydroxyl group, an alkoxycarbonyl group, or a carboxyl group.

When $R^{31}$, $R^{32}$ or $R^{33}$ is a halogen atom, the halogen atom may be a fluorine atom, a chlorine atom, a bromine atom, or the like. Among them, the halogen atom is preferably a fluorine atom or a chlorine atom.

When $R^{31}$, $R^{32}$ or $R^{33}$ is an alkyl group, the alkyl group is preferably a linear, branched or cyclic alkyl group having 1 to 8 carbon atoms. The alkyl group may be substituted or may not be substituted.

When $R^{31}$, $R^{32}$ or $R^{33}$ is an aryl group, the aryl group is preferably an aryl group having 6 to 10 carbon atoms. The aryl group may be substituted or may not be substituted.

When $R^{31}$, $R^{32}$ or $R^{33}$ is an alkylsulfanyl group, the alkylsulfanyl group is preferably an alkylsulfanyl group having 1 to 8 carbon atoms. The alkylsulfanyl group may be substituted or may not be substituted.

When $R^{31}$, $R^{32}$ or $R^{33}$ is an alkylamino group, the alkylamino group is preferably an alkylamino group having 1 to 8 carbon atoms. The alkylamino group may be substituted or may not be substituted.

When $R^{31}$, $R^{32}$ or $R^{33}$ is an alkoxy group, the alkoxy group is preferably an alkoxy group having 1 to 8 carbon atoms. The alkoxy group may be substituted or may not be substituted.

When $R^{31}$, $R^{32}$ or $R^{33}$ is an alkoxycarbonyl group, the alkoxycarbonyl group is preferably an alkoxycarbonyl group having 1 to 8 carbon atoms. The alkoxycarbonyl group may be substituted or may not be substituted.

When $R^{31}$, $R^{32}$ or $R^{33}$ is an acyloxy group, the acyloxy group is preferably an acyloxy group having 1 to 8 carbon atoms. The acyloxy group may be substituted or may not be substituted.

When $R^{31}$, $R^{32}$ or $R^{33}$ is an acyl group, the acyl group is preferably an acyl group having 1 to 8 carbon atoms. The acyl group may be substituted or may not be substituted.

n11, n12, n21, n22 and n31 each independently represent an integer from 0 to 4, and the integer is preferably 0 to 3, and more preferably 0 to 2.

$R^4$ and $R^5$ each independently represent a hydrogen atom, a halogen atom, an alkyl group, an aryl group, a hydroxyl group, a cyano group, a nitro group, an amino group, an alkylsulfanyl group, an alkylamino group, an alkoxy group, an alkoxycarbonyl group, an acyloxy group, an acyl group, a carboxyl group, or a sulfo group. $R^4$ and $R^5$ are each independently preferably a hydrogen atom, a halogen atom, an alkyl group, an aryl group, a hydroxyl group, a cyano group, an alkoxy group, an alkoxycarbonyl group, or a carboxyl group, and more preferably a hydrogen atom or an alkyl group.

$R^4$ and $R^5$ may be bonded to each other and form a ring. When $R^4$ and $R^5$ form a ring, it is more preferable that they form an aromatic ring.

When $R^4$ and $R^5$ are each a halogen atom, the halogen atom may be a fluorine atom, a chlorine atom, a bromine atom or the like. Among them, the halogen atom is preferably a fluorine atom or a chlorine atom.

When $R^4$ and $R^5$ are each an alkyl group, the alkyl group is preferably a linear, branched or cyclic alkyl group having 1 to 8 carbon atoms. The alkyl group may be substituted or may not be substituted.

When $R^4$ and $R^5$ are each an aryl group, the aryl group is preferably an aryl group having 6 to 10 carbon atoms. The aryl group may be substituted or may not be substituted.

When $R^4$ and $R^5$ are alkylsulfanyl groups, the alkylsulfanyl group is preferably an alkylsulfanyl group having 1 to 8 carbon atoms. The alkylsulfanyl group may be substituted or may not be substituted.

When $R^4$ and $R^5$ are each an alkylamino group, the alkylamino group is preferably an alkylamino group having 1 to 8 carbon atoms. The alkylamino group may be substituted or may not be substituted.

When $R^4$ and $R^5$ are each an alkoxy group, the alkoxy group is preferably an alkoxy group having 1 to 8 carbon atoms. The alkoxy group may be substituted or may not be substituted.

When $R^4$ and $R^5$ are each an alkoxycarbonyl group, the alkoxycarbonyl group is preferably an alkoxycarbonyl group having 1 to 8 carbon atoms. The alkoxycarbonyl group may be substituted or may not be substituted.

When $R^4$ and $R^5$ are each an acyloxy group, the acyloxy group is preferably an acyloxy group having 1 to 8 carbon atoms. The acyloxy group may be substituted or may not be substituted.

When $R^4$ and $R^5$ are each an acyl group, the acyl group is preferably an acyl group having 1 to 8 carbon atoms. The acyl group may be substituted or may not be substituted.

the aliphatic 1,2-diketone structure preferably contains a k-valent group obtained by excluding k hydrogen atoms from a compound represented by the following formula (1-B1). k represents an integer of 1, or greater, and k is preferably an integer from 1 to 3, and more preferably 1 or 2.

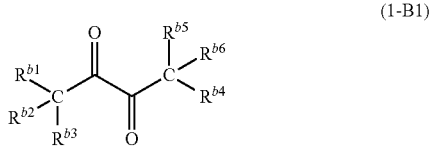

(1-B1)

In the formula (1-B1), $R^{b1}$ to $R^{b6}$ each independently represent a hydrogen atom, a halogen atom, an alkyl group or an aryl group. However, at least any two of $R^{b1}$ to $R^{b6}$ may be bonded to each other and form a ring.

$R^{b1}$ to $R^{b6}$ are each independently preferably a hydrogen atom, a halogen atom or an alkyl group, and more preferably a hydrogen atom or an alkyl group.

When $R^{b1}$ to $R^{b6}$ are each a halogen atom, the halogen atom may be a fluorine atom, a chlorine atom, a bromine atom or the like. Among them, the halogen atom is preferably a fluorine atom or a chlorine atom.

When $R^{b1}$ to $R^{b6}$ are each an alkyl group, the alkyl group is preferably a linear, branched or cyclic alkyl group having 1 to 8 carbon atoms. The alkyl group may be substituted or may not be substituted.

When $R^{b1}$ to $R^{b6}$ are each an aryl group, the aryl group is preferably an aryl group having 6 to 10 carbon atoms. The aryl group may be substituted or may not be substituted.

Examples of the compound represented by the formula (1-B1) include camphorquinone represented by the following formula (1-B1-1).

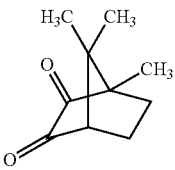

(1-B1-1)

The structure contained in the repeating unit (a1) is preferably an aromatic ketone structure, and is more preferably a benzophenone structure represented by formula (1-A1), or a thioxanthone structure and a thiochromanone structure represented by formula (1-A3), and particularly preferably a thioxanthone structure and a thiochromanone structure represented by formula (1-A3).

The (Component A) of the present invention preferably has any one structure of the following formulae (1-P1) and (1-P2) as the repeating unit (a1).

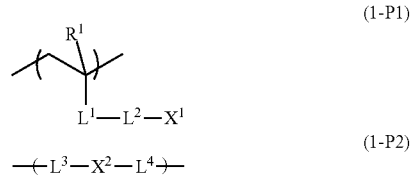

In the formula (1-P1), $R^1$ represents a hydrogen atom or a methyl group; $L^1$ represents a single bond, —COO—, or —CONR$^2$—; $R^2$ represents a hydrogen atom or an alkyl group having 1 to 4 carbon atoms; $L^2$ represents a single bond or a divalent organic group; and $X^1$ represents a residue obtained by excluding one hydrogen atom from a compound represented by one of the formulae (1-A1) to (1-A3).

Here, in the formula (1-P1), it is not necessary for $L^1$ and $L^2$ to simultaneously represent single bonds.

In the formula (1-P1), $R^1$ represents a hydrogen atom or a methyl group. R' is preferably a methyl group.

In the formula (1-P1), $L^1$ represents a single bond, —COO— or —CONR$^2$—. $L^1$ is preferably —COO—.

Furthermore, $R^2$ represents a hydrogen atom or an alkyl group having 1 to 4 carbon atoms. The alkyl group having 1 to 4 carbon atoms may have a linear structure or a branched structure. Specific examples include a methyl group, an ethyl group, a propyl group, an isopropyl group, a butyl group, an isobutyl group, a sec-butyl group, and a t-butyl group. $R^2$ is preferably a hydrogen atom or an alkyl group having 1 to 2 carbon atoms, namely, a methyl group or an ethyl group, and is particularly preferably a hydrogen atom. $R^2$ may be substituted or may not be substituted, but it is preferable that $R^2$ have no substituent.

In the formula (1-P1), $L^2$ represents a single bond or a divalent organic group. The divalent organic group is preferably an alkylene group having 2 to 20 carbon atoms, an arylene group having 6 to 20 carbon atoms, or an aralkylene group having 7 to 30 carbon atoms, and is more preferably an alkylene group having 2 to 20 carbon atoms. The alkylene group contained in the alkylene group and aralkylene group may have a linear structure, a branched structure or a cyclic structure. Furthermore, the alkylene group, arylene group and aralkylene group may have an ether bond, an ester bond, an amide bond, a urethane bond, or a sulfide bond in the molecule, and may be substituted with a hydroxyl group. $L^2$ is preferably an alkylene group having 2 to 20 carbon atoms, more preferably an alkylene group having 2 to 12 carbon atoms, and even more preferably an alkylene group having 2 to 8 carbon atoms.

When $L^2$ is an alkylene group having 2 to 20 carbon atoms, the alkylene group may have a linear structure, a branched structure, or a cyclic structure. The carbon number in the case where $L^2$ is an alkylene group is more preferably 2 to 12, and even more preferably 2 to 8. Specific examples of the alkylene group for $L^2$ include —$CH_2$—, —$C_2H_4$—, —$C(CH_3)_2$—$CH_2$—, —$CH_2C(CH_3)_2CH_2$—, —$C_6H_{12}$—, —$C_4H_7(C_4H_9)$$C_4H_8$—, —$C_{18}H_{36}$—, a 1,4-trans-cyclohexylene group, —$C_2H_4$—OCO—NH—$C_2H_4$—, —$C_2H_4$—OCO—$C_2H_4$—, —$C_2H_4$—O—, —$C_2H_4$—O—$C_5H_{10}$—O—, —$C_2H_4$—NH—COO—, —$C_2H_4$—O—$CH_2$—CH(OH)—$CH_2$—OCO—, —$CH_2$—CH(OH)—$CH_2$—, —$C_2H_4$—OCO—, —$C_2H_4$—O—$C_5H_{10}$—, —$CH_2$—O—$C_5H_9(C_5H_{11})$—, —$C_2H_4$—NH—COO—$C_2H_4$—, —$C_2H_4$—CONH—$C_2H_4$—, —$C_4H_8$—OCONH—$C_6H_{12}$—, —$CH_2$—OCONH$C_{10}H_{20}$—, and —$CH_2CH(OH)CH_2$—.

When $L^2$ is an arylene group having 6 to 20 carbon atoms, the carbon number of the arylene group is preferably 6 to 18, more preferably 6 to 14, and particularly preferably 6 to 10. Specific examples of the arylene group for $L^2$ include a phenylene group, a biphenylene group, —$C_6H_4$—CO—$C_6H_4$—, —$C_6H_4$—S—, and a naphthylene group.

When $L^2$ is an aralkylene group having 7 to 30 carbon atoms, the carbon number of the aralkylene group is preferably 7 to 18, more preferably 7 to 14, and particularly preferably 7 to 10. Specific examples of the aralkylene group include —$C_3H_6$—$C_6H_4$—, —$C_2H_4$—$C_6H_4$—$C_6H_4$—, —$CH_2$—$C_6H_4$—$C_6H_4$—$C_2H_4$—, —$C_2H_4$—OCO—$C_6H_4$—, and —$C_2H_4$—O—$C_2H_4$—$C_6H_4$—S—.

It is preferable that $R^1$ be a hydrogen atom or a methyl group; $L^1$ be —COO—; and $L^2$ be an alkylene group having 2 to 12 carbon atoms and containing an ether bond or an ester bond.

In the formula (1-P2), $L^3$ and $L^4$ each independently represent a single bond or a divalent organic group. $X^2$ represents a residue obtained by excluding two hydrogen atoms from a compound represented by one of the formulae (1-A1) to (1-A3).

$L^3$ and $L^4$ have the same meanings, as well as the same preferred examples, as $L^2$ defined in the formula (1-P1).

In the formula (1-P2), it is preferable that $L^3$ and $L^4$ each independently represent an alkylene group having 2 to 12 carbon atoms and containing an ether bond or an ester bond; and $X^2$ represent a residue obtained by excluding two hydrogen atoms from a compound represented by one of the formulae (1-A1) to (1-A3).

Specific examples of the repeating unit (a1) having an aromatic ketone structure or an aliphatic 1,2-diketone structure are shown below. Meanwhile, the present invention is not intended to be limited to these specific examples.

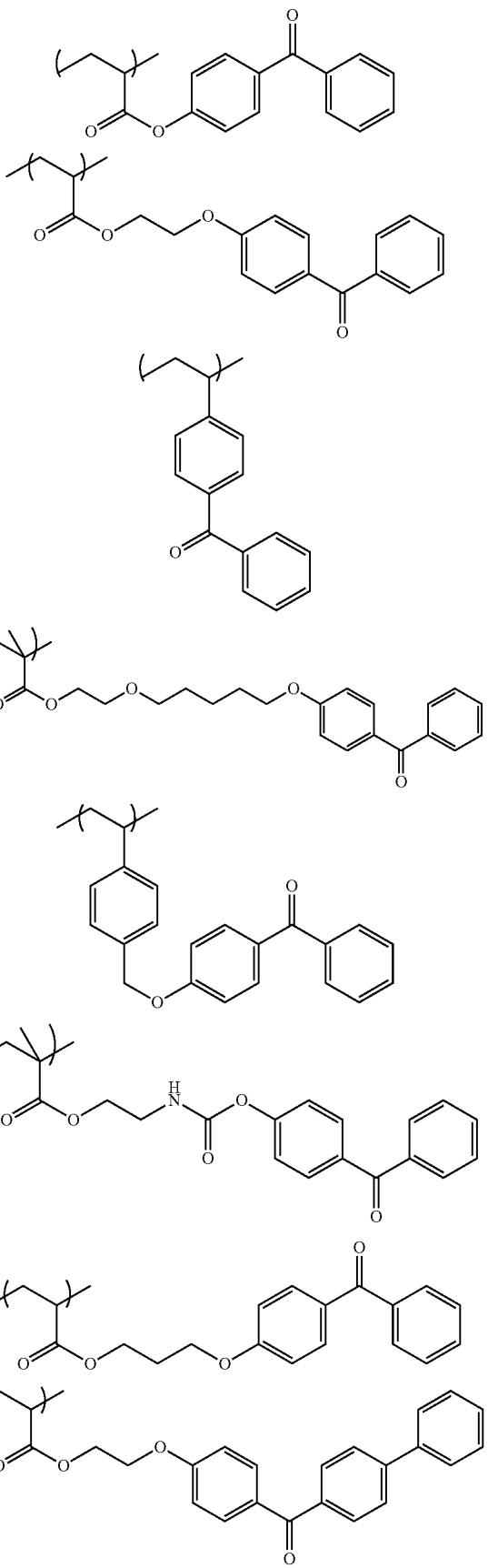

-continued
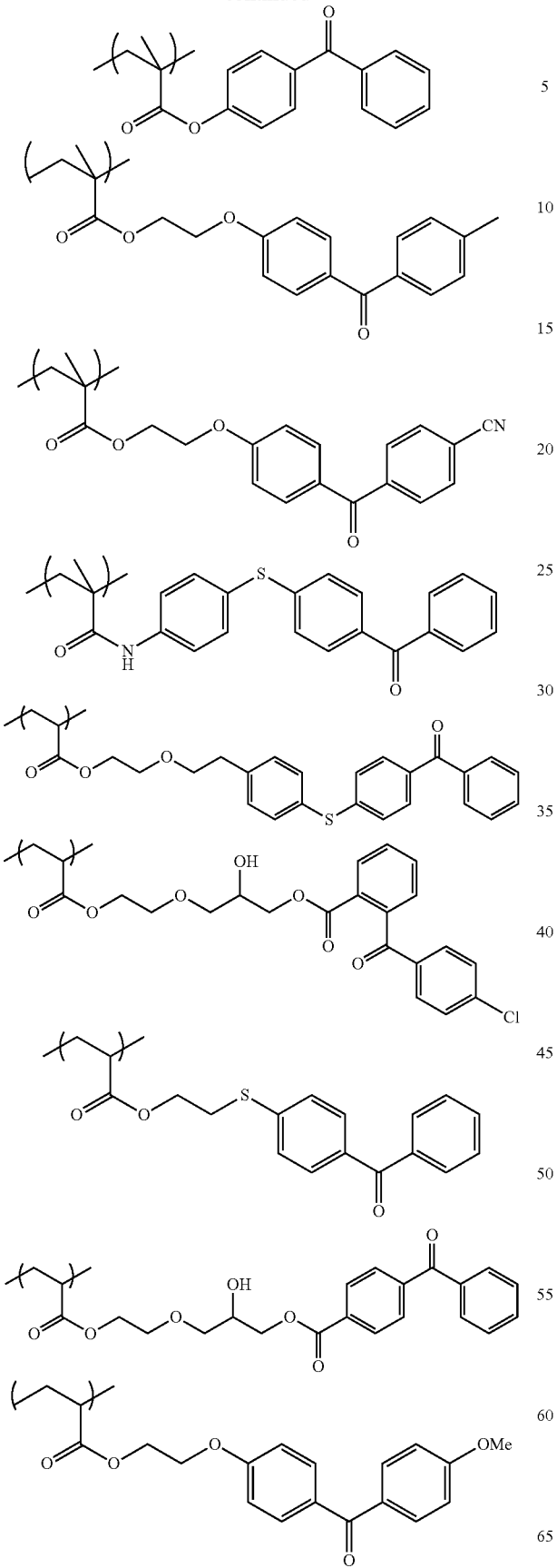
-continued
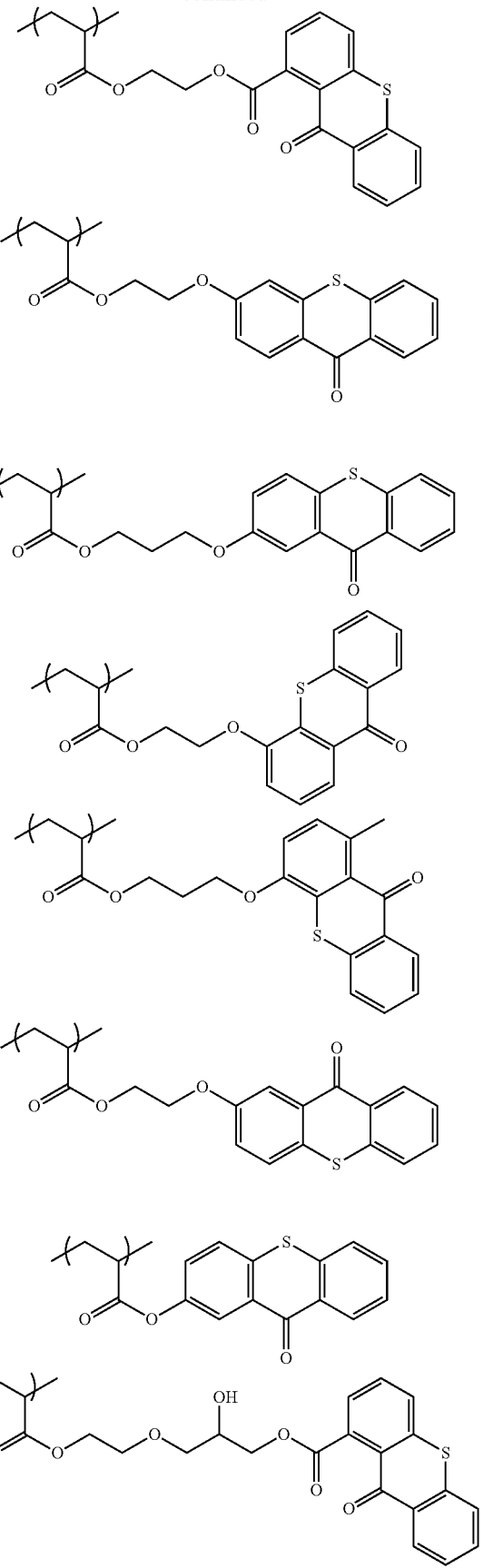

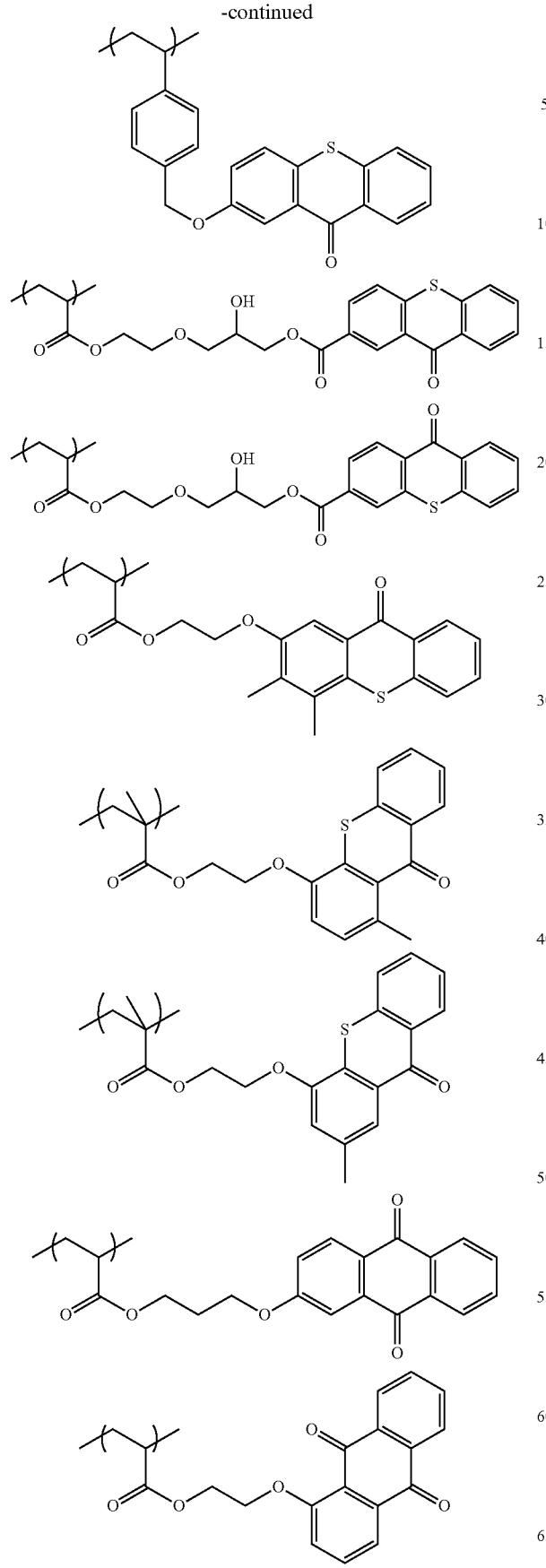
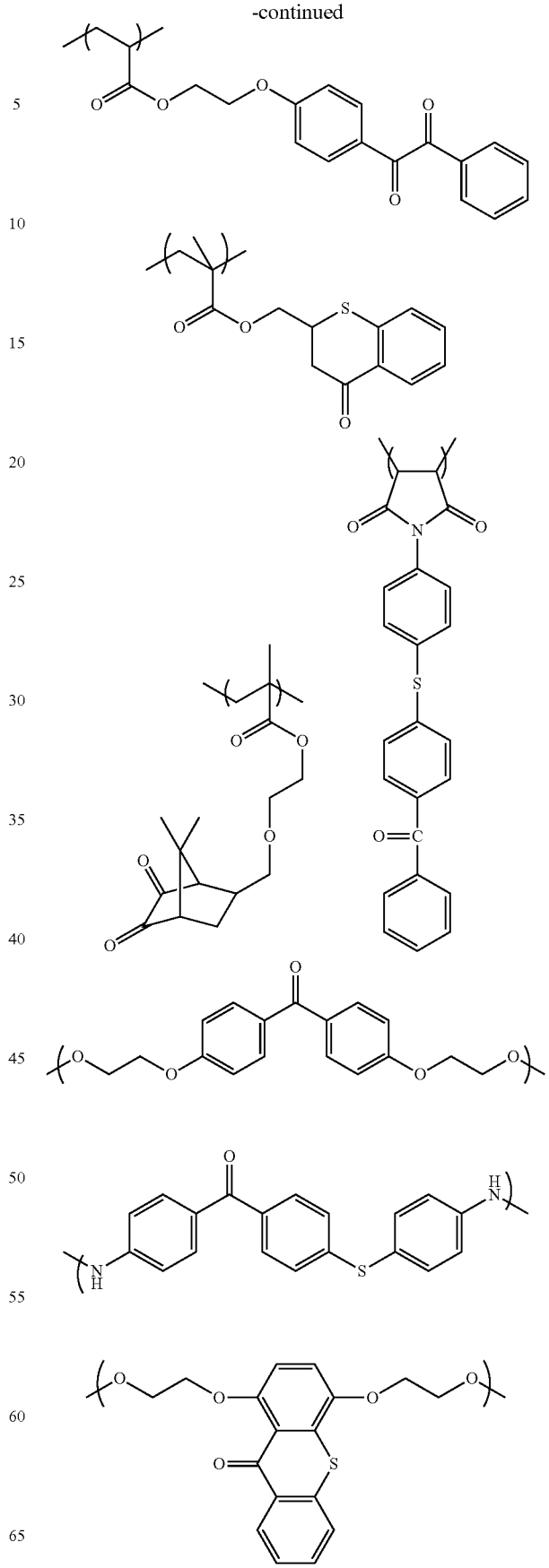

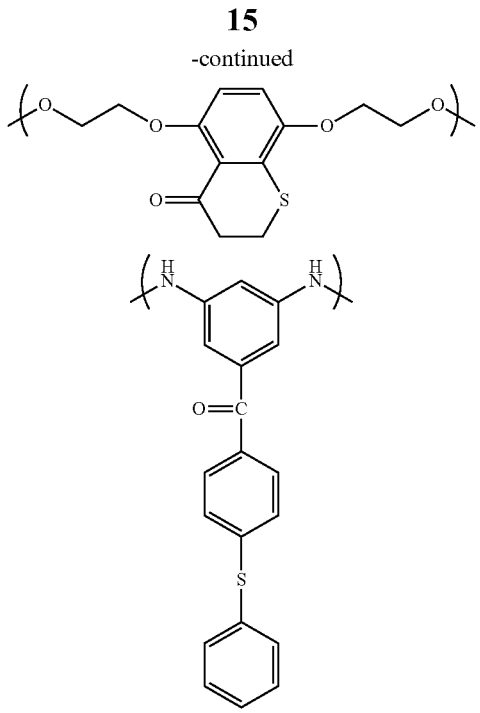

(Repeating unit (a2) having at least one of tertiary amine structure and thiol structure)

The (Component A) used in the present invention contains a repeating unit (a2) having at least one of a tertiary amine structure and a thiol structure.

It is desirable that the tertiary amine structure contain a tertiary amino group, and it is more preferable that the tertiary amine structure contain a p-valent group obtained by excluding p hydrogen atoms from a tertiary amine. Examples of the tertiary amine include aliphatic amines and aromatic amines, and preferred examples include aliphatic amines and N,N-dialkylanilines.

It is desirable that the thiol structure contain a thiol group, and it is more preferable that the thiol structure contain a q-valent group obtained by excluding q hydrogen atoms from a thiol. The thiol is preferably a heterocyclic thiol in which a thiol group is bonded to a heterocyclic ring, or the like.

The (Component A) of the present invention preferably has any one structure of the following formulae (2-P1) to (2-P4) as the repeating unit (a2). Here, the formulae (2-P1), (2-P3) and (2-P4) are each a repeating unit having a tertiary amine structure, and the formula (2-P2) is a repeating unit having a thiol structure.

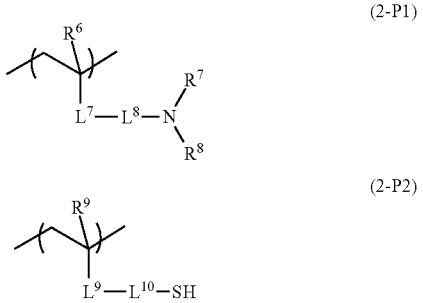

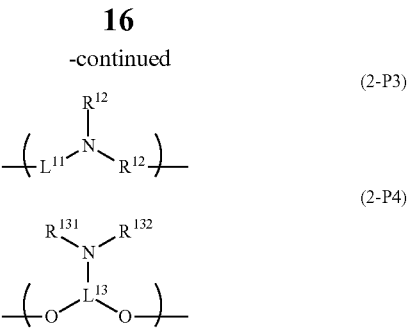

In the formula (2-P1), $R^6$ represents a hydrogen atom or a methyl group; $L^7$ represents a single bond, —COO—, or —CONR$^{10}$—, $R^{10}$ represents a hydrogen atom or an alkyl group having 1 to 4 carbon atoms; $L^8$ represents a single bond or a divalent organic group; $R^7$ and $R^8$ each independently represent an alkyl group having 1 to 4 carbon atoms.

Here, in the formula (2-P1), it is not necessary that $L^7$ and $L^8$ simultaneously represent single bonds.

In the formula (2-P1), $R^6$ represents a hydrogen atom or a methyl group. $R^6$ is preferably a methyl group.

In the formula (2-P1), $L^7$ represents a single bond, —COO—, or —CONR$^{10}$—. $L^7$ is preferably —COO—.

Furthermore, $R^{10}$ represents a hydrogen atom or an alkyl group having 1 to 4 carbon atoms. The alkyl group having 1 to 4 carbon atoms may have a linear structure or a branched structure. Specific examples include a methyl group, an ethyl group, a propyl group, an isopropyl group, a butyl group, an isobutyl group, a sec-butyl group, and a t-butyl group. $R^{10}$ is preferably a hydrogen atom or an alkyl group having 1 to 2 carbon atoms, namely, a methyl group or an ethyl group, and is particularly preferably a hydrogen atom. Meanwhile, $R^{10}$ may be substituted or may not be substituted, but it is preferable that $R^{10}$ have no substituent.

In the formula (2-P1), $L^8$ represents a single bond or a divalent organic group. The divalent organic group is preferably an alkylene group having 2 to 20 carbon atoms, an arylene group having 6 to 20 carbon atoms, or an aralkylene group having 7 to 30 carbon atoms, and is more preferably an alkylene group having 2 to 20 carbon atoms. The alkylene group in the alkylene group and the aralkylene group may have a linear structure, a branched structure, or a cyclic structure. Furthermore, the alkylene group, arylene group and aralkylene group may have an ether bond, an ester bond, an amide bond, a urethane bond or a sulfide bond in the molecule, or may be substituted with a hydroxyl group. $L^8$ is preferably an alkylene group having 2 to 20 carbon atoms, more preferably an alkylene group having 2 to 12 carbon atoms, and even more preferably an alkylene group having 2 to 8 carbon atoms.

When $L^8$ is an alkylene group having 2 to 20 carbon atoms, the alkylene group may have a linear structure, a branched structure, or a cyclic structure. The carbon number in the case where $L^8$ is an alkylene group is more preferably 2 to 12, and even more preferably 2 to 8. Specific examples of the alkylene group for $L^8$ include —CH$_2$—, —C$_2$H$_4$—, —C(CH$_3$)$_2$—CH$_2$—, —CH$_2$C(CH$_3$)$_2$CH$_2$—, —C$_6$H$_{12}$—, —C$_4$H$_7$(C$_4$H$_9$)C$_4$H$_8$—, —C$_{18}$H$_{36}$—, a 1,4-trans-cyclohexylene group, —C$_2$H$_4$—OCO—NH—C$_2$H$_4$—, —C$_2$H$_4$—OCO—C$_2$H$_4$—, —C$_2$H$_4$—O—, —C$_5$H$_{10}$—O—, —C$_2$H$_4$—NH—COO—, —C$_2$H$_4$—O—CH$_2$—CH(OH)—CH$_2$—OCO—, —CH$_2$—CH(OH)—CH$_2$—, —C$_2$H$_4$—OCO—, —C$_2$H$_4$—O—C$_5$H$_{10}$—, —CH$_2$—O—C$_5$—H$_9$(C$_5$H$_{11}$)—, —C$_2$H$_4$—NH—

COO—$C_2H_4$—, —$C_2H_4$—CONH—$C_2H_4$—, —$C_4H_8$—OCONH—$C_6H_{12}$—, —$CH_2$—OCONH$C_{10}H_{20}$—, and —$CH_2CH(OH)CH_2$—.

When $L^8$ is an arylene group having 6 to 20 carbon atoms, the carbon number of the arylene group is preferably 6 to 18, more preferably 6 to 14, and particularly preferably 6 to 10. Specific examples of the arylene group for $L^8$ include a phenylene group, a biphenylene group, —$C_6H_4$—CO—$C_6H_4$—, —$C_6H_4$—S—, and a naphthylene group.

When $L^8$ is an aralkylene group having 7 to 30 carbon atoms, the carbon number of the aralkylene group is preferably 7 to 18, more preferably 7 to 14, and particularly preferably 7 to 10. Specific examples of the aralkylene group include —$C_3H_6$—$C_6H_4$—, —$C_2H_4$—$C_6H_4$—$C_6H_4$—, —$CH_2$—$C_6H_4$—$C_6H_4$—$C_2H_4$—, —$C_2H_4$—OCO—$C_6H_4$—, and —$C_2H_4$—O—$C_2H_4$—$C_6H_4$—S—.

In the formula (2-P1), $R^7$ and $R^8$ each independently represent an alkyl group having 1 to 4 carbon atoms. The alkyl group having 1 to 4 carbon atoms may have a linear structure or a branched structure. Specific examples include a methyl group, an ethyl group, a propyl group, an isopropyl group, a butyl group, an isobutyl group, a sec-butyl group, and a t-butyl group. $R^7$ and $R^8$ are each preferably an alkyl group having 1 to 2 carbon atoms, namely, a methyl group or an ethyl group. Meanwhile, $R^7$ and $R^8$ may be substituted or may not be substituted, but it is preferable that $R^7$ and $R^8$ have no substituent.

In the formula (2-P1), it is preferable that $R^6$ be a methyl group; $L^7$ be —COO—; $L^8$ be an alkylene group having 2 to 12 carbon atoms; and $R^7$ and $R^8$ be each independently a methyl group or an ethyl group.

In the formula (2-P2), $R^9$ represents a hydrogen atom or a methyl group; $L^9$ represents a single bond, —COO—, or —$CONR^{11}$—; $R^{11}$ represents a hydrogen atom or an alkyl group having 1 to 4 carbon atoms; and $L^{10}$ represents a single bond or a divalent organic group.

Here, in the formula (2-P2), it is not necessary that $L^9$ and $L^{10}$ simultaneously represent single bonds.

In the formula (2-P2), $R^9$ represents a hydrogen atom or a methyl group. $R^9$ is preferably —COO—.

In the formula (2-P2), $L^9$ represents a single bond, —COO—, or —$CONR^{11}$—. $L^9$ is preferably —COO—.

Furthermore, $R^{11}$ represents a hydrogen atom or an alkyl group having 1 to 4 carbon atoms. The alkyl group having 1 to 4 carbon atoms may have a linear structure or a branched structure. Specific examples include a methyl group, an ethyl group, a propyl group, an isopropyl group, a butyl group, an isobutyl group, a sec-butyl group, and a t-butyl group. $R^{11}$ is preferably a hydrogen atom, or an alkyl group having 1 to 2 carbon atoms, namely, a methyl group or an ethyl group, and is particularly preferably a hydrogen atom. Meanwhile, $R^{11}$ may be substituted or may not be substituted, but it is preferable that $R^{11}$ have no substituent.

In the formula (2-P2), $L^{10}$ represents a single bond or a divalent organic group. The divalent organic group is preferably a group composed of an alkylene group having 2 to 20 carbon atoms and a heterocyclic group containing a nitrogen atom. The alkylene group may have a linear structure, a branched structure, or a cyclic structure. Furthermore, the alkylene group may have an ether bond, an ester bond, an amide bond, a urethane bond, an arylene group or the like in the molecule.

When $L^{10}$ contains an alkylene group, the alkylene group preferably has 2 to 20 carbon atoms, more preferably 2 to 12 carbon atoms, and even more preferably 2 to 8 carbon atoms.

When $L^{10}$ contains a heterocyclic group containing a nitrogen atom, the heterocyclic group containing a nitrogen atom is preferably a 5- to 7-membered heterocyclic group having one to three nitrogen atoms, more preferably a 6-membered heterocyclic group having two to three nitrogen atoms, and particularly preferably a 5-membered heterocyclic group having three nitrogen atoms.

When $L^{10}$ is a group composed of an alkylene group having 2 to 20 carbon atoms and a heterocyclic group containing a nitrogen atom, the group composed of an alkylene group having 2 to 20 carbon atoms and a heterocyclic group containing a nitrogen atom is preferably a group represented by the formula: —$R^N$-E- (wherein $R^N$ represents an alkylene group having 2 to 12 carbon atoms, and E represents a 5-membered heterocyclic group having three nitrogen atoms).

Examples of the group represented by —$R^N$-E- include —$C_2H_4$-E-, —$C(CH_3)_2$—$CH_2$-E-, —$C_2H_4$—CO—NH—$CH_2$-E-, —$C_6H_{12}$-E-, and —$C_2H_4$—NH—COO—$C_2H_4$-E-. Here, E represents a 5-membered heterocyclic group having three nitrogen atoms.

In the formula (2-P2), it is preferable that $R^9$ be a hydrogen atom or a methyl group; $L^9$ be —COO—; $L^{10}$ be a group composed of an alkylene group having 2 to 12 carbon atoms and a 5-membered heterocyclic group having three nitrogen atoms.

In the formula (2-P3), $R^{12}$ represents an alkyl group having 1 to 4 carbon atoms; and $L^{11}$ and $L^{12}$ each represent a single bond or a divalent organic group.

Here, in the formula (2-P3), it is not necessary that $L^{11}$ and $L^{12}$ simultaneously represent single bonds.

In the formula (2-P3), $R^{12}$ represents an alkyl group having 1 to 4 carbon atoms. The alkyl group having 1 to 4 carbon atoms may have a linear structure or a branched structure. Specific examples include a methyl group, an ethyl group, a propyl group, an isopropyl group, a butyl group, an isobutyl group, a sec-butyl group, and a t-butyl group. $R^{12}$ is preferably an alkyl group having 1 to 2 carbon atoms, namely, a methyl group or an ethyl group. Meanwhile, $R^{12}$ may be substituted or may not be substituted, but it is preferable that $R^{12}$ have no substituent.

$L^{11}$ and $L^{12}$ have the same meanings, as well as the same preferred examples, as $L^8$ defined in the formula (2-P1).

In the formula (2-P3), it is preferable that $R^{12}$ be a methyl group or an ethyl group; and $L^{11}$ and $L^{12}$ be each independently an alkylene group having 2 to 12 carbon atoms.

In the formula (2-P4), $L^{13}$ represents a residue obtained by excluding three hydrogen atoms from a saturated hydrocarbon; and $R^{131}$ and $R^{132}$ each independently represent an alkyl group having 1 to 4 carbon atoms.

In the formula (2-P4), $L^{13}$ represents a residue obtained by excluding three hydrogen atoms from a saturated hydrocarbon.

The carbon number of the saturated hydrocarbon is preferably 3 to 30, more preferably 3 to 25, and even more preferably 3 to 10. The saturated hydrocarbon may have any one of linear, branched and cyclic structures.

$L^{13}$ is particularly preferably a residue obtained by excluding three hydrogen atoms from a linear saturated hydrocarbon having 3 to 10 carbon atoms.

Specific examples of the saturated hydrocarbon include compounds such as propane, 2-methylpropane, butane, pentane, and cyclohexane. Furthermore, the saturated hydrocarbons may be each interrupted with an arylene group, an ether bond (—O—), an imino bond (—NH—), an amide bond (—CONH—), an ester bond (—COO—), a sulfonamide bond (—$NHSO_2$—), a urethane bond (—NHCOO—), a ureylene bond (—NHCONH—), a carbonate bond (—OCOO—) or the like.

In the formula (2-P4), $R^{131}$ and $R^{132}$ each independently represent an alkyl group having 1 to 4 carbon atoms. Specific examples include a methyl group, an ethyl group, a propyl group, an isopropyl group, a butyl group, an isobutyl group, a sec-butyl group, and a t-butyl group. $R^{131}$ and $R^{132}$ are each independently an alkyl group having 1 to 2 carbon atoms, namely, a methyl group or an ethyl group. Meanwhile, $R^{131}$ and $R^{132}$ may be substituted or may not be substituted, but it is preferable that $R^{131}$ and $R^{132}$ have no substituent.

In the formula (2-P4), $L^{13}$ is preferably a residue obtained by excluding three hydrogen atoms from a linear saturated hydrocarbon having 3 to 10 carbon atoms, and $R^{131}$ and $R^{132}$ are each independently a methyl group or an ethyl group.

Specific examples of the repeating unit (a2) having at least one of a tertiary amine structure and a thiol structure are shown below. However, the present invention is not intended to be limited to these specific examples.

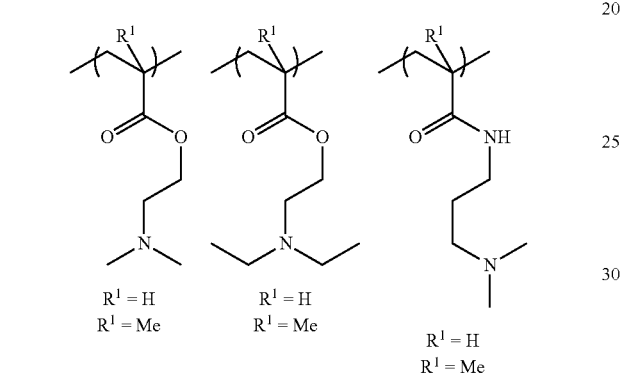

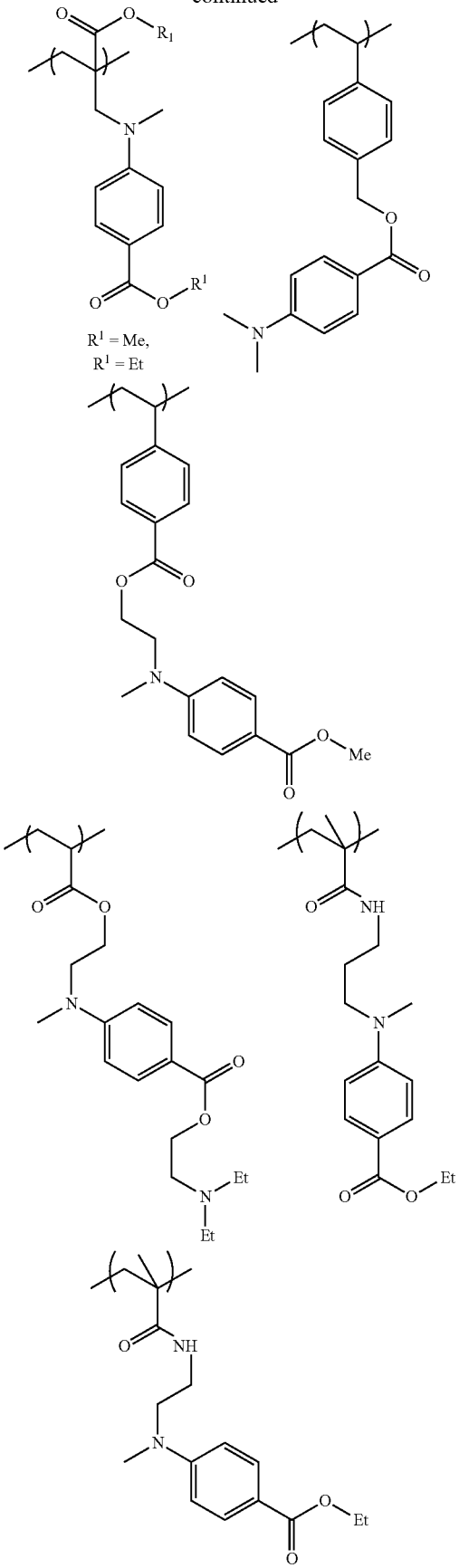

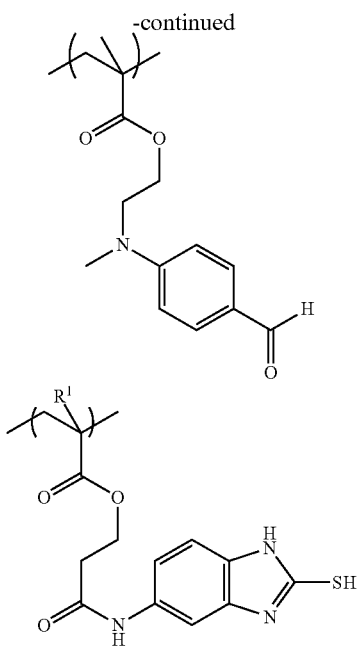

R¹ = H
R¹ = Me

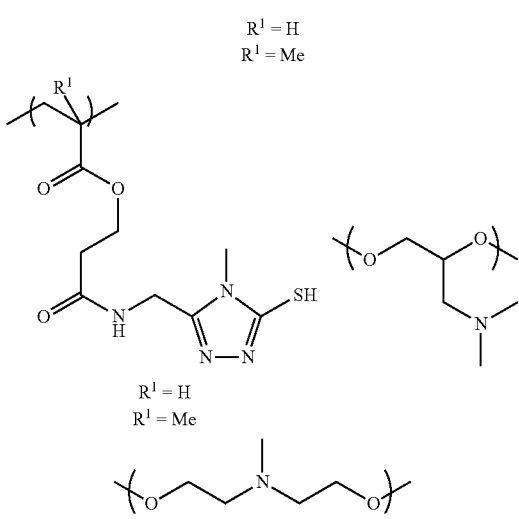

R¹ = H
R¹ = Me (Repeating unit (a3) having ethylenically unsaturated double bond)

Examples of the ethylenically unsaturated double bond group include unsaturated carboxylic acid ester groups such as a (meth)acryloyloxy group, a (meth)acrylamide group, an itaconic acid ester group, a crotonic acid ester group, an isocrotonic acid ester group, and a maleic acid ester group; and radical polymerizable groups such as a styrene group. Among them, a (meth)acryloyloxy group and a (meth)acrylamide group are preferred. The (meth)acryloyloxy group means an acryloyloxy group or a methacryloyloxy group, and the (meth)acrylamide group means an acrylamide group or a methacrylamide group.

The (Component A) of the present invention preferably has any one structure of the following formulae (3-P1) and (3-P2) as the repeating unit (a3).

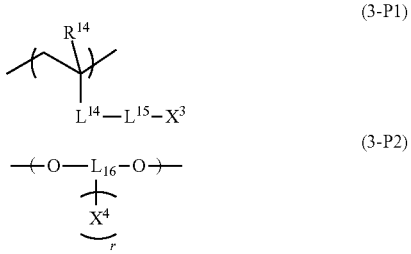

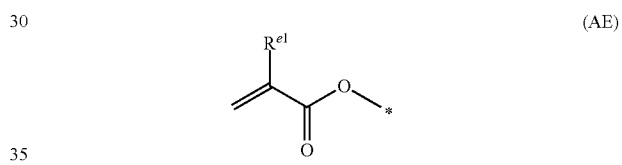

In the formula (3-P1), $R^{14}$ represents a hydrogen atom or a methyl group; $L^{14}$ represents a single bond, —COO—, or —CONR$^{15}$—; $R^{15}$ represents a hydrogen atom or an alkyl group having 1 to 4 carbon atoms; $L^{15}$ represents a single bond or a divalent organic group; $X^3$ represents a (meth)acryloyloxy group, a (meth)acrylamide group, an itaconic acid ester group, a crotonic acid ester group, an isocrotonic acid ester group, a maleic acid ester group, or a styrene group.

Here, in the formula (3-P1), it is not necessary that $L^{14}$ and $L^{15}$ simultaneously represent single bonds.

$X^3$ in the formula (3-P1) is preferably a (meth)acryloyloxy group or a (meth)acrylamide group.

The (meth)acryloyloxy group is preferably a group represented by the following formula (AE).

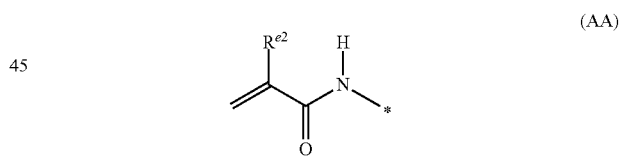

$R^{e1}$ in the formula (AE) represents a hydrogen atom or a methyl group. * represents the position of bonding.

The (meth)acrylamide group is preferably a group represented by the following formula (AA).

(AA)

$R^{e2}$ in the formula (AA) represents a hydrogen atom or a methyl group. * represents the position of bonding.

In the formula (3-P1), $R^{14}$ represents a hydrogen atom or a methyl group. $R^{14}$ is preferably a methyl group.

In the formula (3-P1), $L^{14}$ represents a single bond, —COO—, or —CONR$^{15}$—. $L^{14}$ is preferably —COO—.

Furthermore, $R^{15}$ represents a hydrogen atom or an alkyl group having 1 to 4 carbon atoms. The alkyl group having 1 to 4 carbon atoms may have a linear structure or a branched structure. Specific examples include a methyl group, an ethyl group, a propyl group, an isopropyl group, a butyl group, an isobutyl group, a sec-butyl group, and a t-butyl group. $R^{15}$ is preferably a hydrogen atom or an alkyl group having 1 to 2 carbon atoms, namely, a methyl group or an ethyl group, and is particularly preferably a hydrogen atom.

Meanwhile, $R^{15}$ may be substituted or may not be substituted, but it is preferable that $R^{15}$ have no substituent.

In the formula (3-P1), $L^{15}$ represents a single bond or a divalent organic group. The divalent organic group is preferably an alkylene group having 2 to 20 carbon atoms, an arylene group having 6 to 20 carbon atoms, or an aralkylene group having 7 to 30 carbon atoms, and more preferably an alkylene group having 2 to 20 carbon atoms. The alkylene group in the alkylene group and an aralkylene group may have a linear structure, a branched structure or a cyclic structure. Furthermore, the alkylene group, arylene group and aralkylene group may have an ether bond, an ester bond, an amide bond, a urethane bond or a sulfide bond in the molecule, or may be substituted with a hydroxyl group. $L^{15}$ is preferably an alkylene group having 2 to 20 carbon atoms, more preferably an alkylene group having 2 to 12 carbon atoms, and even more preferably an alkylene group having 2 to 8 carbon atoms.

When $L^{15}$ is an alkylene group having 2 to 20 carbon atoms, the alkylene group may have a linear structure, a branched structure or a cyclic structure. The carbon number in the case where $L^{15}$ is an alkylene group is more preferably 2 to 12, and even more preferably 2 to 8. Specific examples of the alkylene group for $L^{15}$ include —$CH_2$—, —$C_2H_4$—, —$C(CH_3)_2$—$CH_2$—, —$CH_2C(CH_3)_2CH_2$—, —$C_6H_{12}$—, —$C_4H_7(C_4H_9)C_4H_8$—, —$C_{18}H_{36}$—, a 1,4-trans-cyclohexylene group, —$C_2H_4$—OCO—NH—$C_2H_4$—, —$C_2H_4$—OCO—$C_2H_4$—, —$C_2H_4$—O—, —$C_2H_4$—O—$C_5H_{10}$—O—, —$C_2H_4$—NH—COO—, —$C_2H_4$—O—$CH_2$—CH(OH)—$CH_2$—OCO—, —$CH_2$—CH(OH)—$CH_2$—, —$C_2H_4$—OCO—, —$C_2H_4$—O—$C_5H_{10}$—, —$CH_2$—O—$C5H_9(C_5H_{11})$—, —$C_2H_4$—NH—COO—$C_2H_4$—, —$C_2H_4$—CONH—$C_2H_4$—, —$C_4H_8$—OCONH—$C_6H_{12}$—, —$CH_2$—OCONH$C_{10}H_{20}$—, and —$CH_2CH(OH)CH_2$—.

When $L^{15}$ is an arylene group having 6 to 20 carbon atoms, the carbon number of the arylene group is preferably 6 to 18, more preferably 6 to 14, and particularly preferably 6 to 10. Specific examples of the arylene group for $L^{15}$ include a phenylene group, a biphenylene group, —$C_6H_4$—CO—$C_6H_4$—, —$C_6H_4$—S—, and a naphthylene group.

When $L^{15}$ is an aralkylene group having 7 to 30 carbon atoms, the carbon number of the aralkylene group is preferably 7 to 18, more preferably 7 to 14, and particularly preferably 7 to 10. Specific examples of the aralkylene group include —$C_3H_6$—$C_6H_4$—, —$C_2H_4$—$C_6H_4$—$C_6H_4$—, —$CH_2$—$C_6H_4$—$C_6H_4$—$C_2H_4$—, —$C_2H_4$—OCO—$C_6H_4$—, and —$C_2H_4$—O—$C_2H_4$—$C_6H_4$—S—.

In the formula (3-P1), it is preferable that $R^{14}$ be a hydrogen atom or a methyl group, $L'^4$ be —COO—, and $L^{15}$ be an alkylene group having 2 to 12 carbon atoms.

In the formula (3-P2), $L^{16}$ represents a residue obtained by excluding (2+r) hydrogen atoms from a saturated hydrocarbon. Here, r represents an integer from 1 to 3, and is preferably 1 or 2.

The carbon number of the saturated hydrocarbon is preferably 3 to 30, more preferably 3 to 25, and even more preferably 3 to 10. The saturated hydrocarbon may have any one of a linear structure, a branched structure and a cyclic structure.

Specific examples of the saturated hydrocarbon include compounds such as propane, 2-methylpropane, butane, pentane, and cyclohexane. Furthermore, the saturated hydrocarbon may be interrupted with an arylene group, an ether bond (—O—), an imino bond (—NH—), an amide bond (—CONH—), an ester bond (—COO—), a sulfonamide bond (—$NHSO_2$—), a urethane bond (—NHCOO—), a ureylene bond (—NHCONH—), a carbonate bond (—OCOO—), or the like.

$L^{16}$ is more preferably a residue obtained by excluding (2+r) hydrogen atoms from a linear saturated hydrocarbon having 3 to 10 carbon atoms, and particularly preferably contains an ether bond (—O—) in the saturated hydrocarbon.

$X^4$ represents a (meth)acryloyloxy group, a (meth)acrylamide group, an itaconic acid ester group, a crotonic acid ester group, an isocrotonic acid ester group, a maleic acid ester group, a carboxylic acid amide group or a styrene group.

$X^4$ is preferably a (meth)acryloyloxy group or a (meth)acrylamide group. A preferred structure of the (meth)acryloyloxy group may be the formula (AE) described for $X^3$, and a preferred structure of the (meth)acrylamide group may be the formula (AA) described for $X^3$.

In the formula (3-P2), it is preferable that $L^{16}$ be a residue obtained by excluding (2+r) hydrogen atoms from a linear saturated hydrocarbon having 3 to 10 carbon atoms, $X^4$ be a (meth)acryloyloxy group or a (meth)acrylamide group, and r be an integer from 1 to 3.

As a method for introducing an ethylenically unsaturated double bond group into a specific polymer, a method of using a monomer which encapsulates the reactivity of the double bond using a protective group, copolymerizing this monomer, and removing the protective group to obtain an ethylenically unsaturated double bond group (double bond); or a method of introducing a low molecular weight compound having an ethylenically unsaturated double bond group into a specific polymer through a polymer reaction, may be used.

Specific examples of the repeating unit (a3) having an ethylenically unsaturated double bond group are shown below. Meanwhile, the present invention is not intended to be limited to these specific examples.

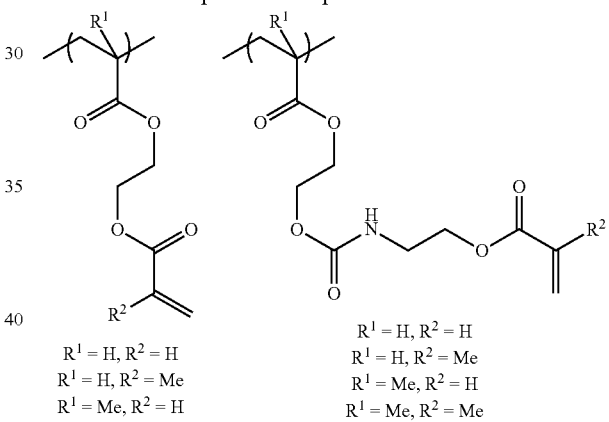

$R^1$ = H, $R^2$ = H
$R^1$ = H, $R^2$ = Me
$R^1$ = Me, $R^2$ = H
$R^1$ = Me, $R^2$ = Me $R^1$ = H, $R^2$ = H
$R^1$ = H, $R^2$ = Me
$R^1$ = Me, $R^2$ = H
$R^1$ = Me, $R^2$ = Me

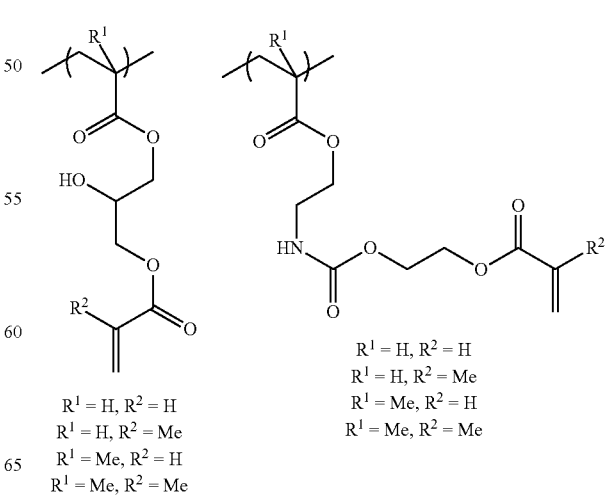

$R^1$ = H, $R^2$ = H
$R^1$ = H, $R^2$ = Me
$R^1$ = Me, $R^2$ = H
$R^1$ = Me, $R^2$ = Me $R^1$ = H, $R^2$ = H
$R^1$ = H, $R^2$ = Me
$R^1$ = Me, $R^2$ = H
$R^1$ = Me, $R^2$ = Me

-continued

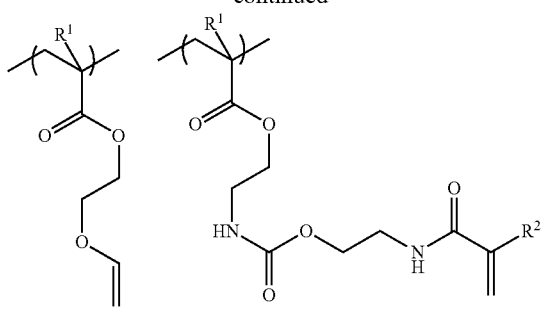

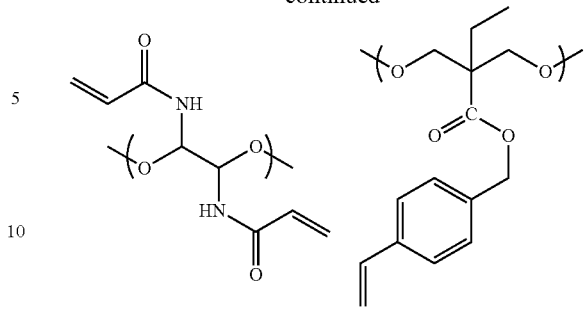

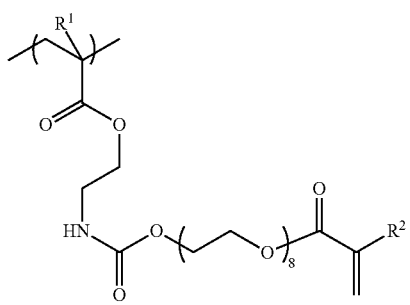

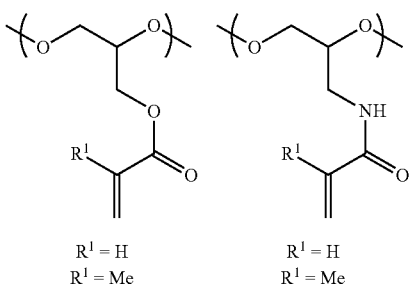

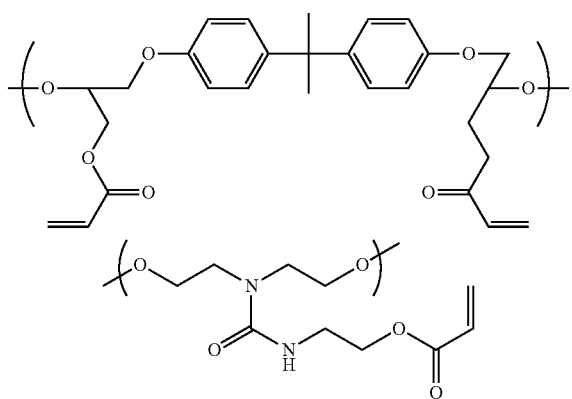

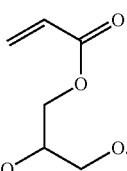

The (Component A) in the case where the ink composition of the present invention contains water is preferably water-soluble or water-dispersible, and more preferably water-soluble. It is preferable that 1 g of the (Component A) be soluble in 30 ml or less of water at 25° C., more preferably soluble in 20 ml or less of water, and particularly preferably soluble in 10 ml or less of water.

When the ink composition of the present invention contains water, the (Component A) preferably has a water-soluble group, and the water-soluble group in the (Component A) is not limited as long as it is a group capable of imparting water solubility or water dispersibility to the compound of the (Component A). The water-soluble group which may be carried by the (Component A) may be a nonionic water-soluble group, or either of ionic water-soluble groups of anionic and cationic water-soluble groups can be used, such that there are no limitations.

There are no limitations on the nonionic water-soluble group used in the present invention, but examples include a residue obtained by excluding one hydrogen atom from a heterocyclic compound containing a nitrogen atom or an oxygen atom, an amide group, a carbamoyl group, an alkyl-substituted carbamoyl group, an alcoholic hydroxyl group, and a group having a polyalkyleneoxy structure. A carbamoyl group, an alkyl-substituted carbamoyl group, an alcoholic hydroxyl group, and a group having a polyalkyleneoxy structure are preferred, and an alcoholic hydroxyl group and a group having a polyalkyleneoxy structure are more preferred.

Examples of the heterocyclic compound containing a nitrogen atom or an oxygen atom include lactones such as γ-butyrolactone; cyclic ureas such as 2-pyrrolidone and ethyleneurea; cyclic carbonates such as ethylene carbonate and propylene carbonate; cyclic ethers such as tetrahydrofuran and 1,4-dioxane; and crown ethers such as 12-crown-4.

There are no limitations on the amide group, but preferable examples include a group represented by the following formula (11).

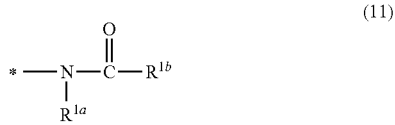

(11)

In the formula (11), $R^{1a}$ and $R^{1b}$ each independently represent a hydrogen atom or an alkyl group; $R^{1a}$ and $R^{1b}$ may be bonded to each other and form a 4- to 6-membered ring.

$R^{1a}$ and $R^{1b}$ in the formula (11) each independently represent a hydrogen atom or an alkyl group. The alkyl group for $R^{1a}$ and $R^{1b}$ represents a linear or branched alkyl group, and may contain a —COO— bond, an —O— bond, or an —NH— bond. The alkyl group preferably has 1 to 10 carbon atoms, more preferably 1 to 6 carbon atoms, and particularly preferably 1 to 3 carbon atoms. $R^{1a}$ and $R^{1b}$ may be bonded to each other and form a 4- to 6-membered ring. These groups may be substituted or may not be substituted, but it is preferable that the groups have no substituent. Specific examples of the alkyl group represented by $R^{1a}$ and $R^{1b}$ include a methyl group and a t-butyl group.

In the formula (11), the substituent that may be carried by $R^{1a}$ and $R^{1b}$ is preferably a hydroxyl group or the like.

Examples of the alkyl-substituted carbamoyl group include a monoalkylcarbamoyl group in which the hydrogen atom bonded to N of the carbamoyl group is substituted by an alkyl group, and a dialkylcarbamoyl group in which two hydrogen atoms bonded to N of the carbamoyl group are substituted by alkyl groups. Specific preferred examples include a group represented by the following formula (12).

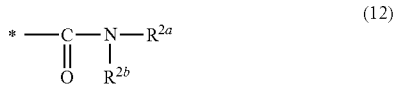

(12)

In the formula (12), the substituent that may be carried by $R^{1a}$ and $R^{1b}$ is preferably a hydroxyl group or the like. In the formula (12), $R^{2a}$ and $R^{2b}$ each independently represent a hydrogen atom or an alkyl group. $R^{2a}$ and $R^{2b}$ may be bonded to each other and form a 4- to 6-membered ring.

$R^{2a}$ and $R^{2b}$ in the formula (12) each independently represent a hydrogen atom or an alkyl group. The alkyl group in $R^{2a}$ and $R^{2b}$ represents a linear or branched alkyl group, and may contain an —O— bond, a —COO— bond, or a —C(=O)— bond. The alkyl group preferably has 1 to 10 carbon atoms, more preferably 1 to 6 carbon atoms, and particularly preferably 1 to 3 carbon atoms. $R^{2a}$ and $R^{2b}$ may be bonded to each other and form a 4- to 6-membered ring. Specific examples of the alkyl group represented by $R^{2a}$ and $R^{2b}$ include, but are not limited to, a methylene group and an ethylene group. These groups may be substituted or may not be substituted, but it is preferable that the groups have no substituent.

In the formula (12), the substituent that may be carried by $R^{2a}$ and $R^{2b}$ is preferably an alkoxy group having 1 to 2 carbon atoms, a hydroxyl group, or the like.

Preferred examples of the group having a polyalkyleneoxy structure include, but are not limited to, a group represented by the following formula (13).

(13)

In the formula (13), $R^{3a}$ represents an alkylene group; $R^{3b}$ represents a hydrogen atom or an alkyl group; n3 represents an integer from 4 to 50, and multiple $R^{3a}$'s that are present may be identical with or different from each other.

$R^{3a}$ in the formula (13) represents an alkylene group. The alkylene group represented by $R^{3a}$ represents a linear, branched or cyclic alkylene group, and may contain an —O— bond or a —COO— bond. The alkylene group preferably has 1 to 10 carbon atoms, preferably 1 to 6 carbon atoms, and particularly preferably 1 to 3 carbon atoms. Multiple $R^{3a}$'s that are present based on the formula (13) may be identical with or different from each other, and it is preferable that the substituents be identical. These groups may be substituted or may not be substituted, but it is preferable that the groups have no substituent. Specific examples of the alkylene group represented by $R^{3a}$ include an ethylene group.

The substituent that may be carried by $R^{3a}$ in the formula (13) is preferably an alkoxy group having 1 to 2 carbon atoms, a hydroxyl group, or the like.

$R^{3b}$ in the formula (13) represents a hydrogen atom or an alkyl group. The alkyl group represented by $R^{3b}$ represents a linear, branched or cyclic alkyl group, and preferably has 1 to 10 carbon atoms, more preferably 1 to 6 carbon atoms, and particularly preferably 1 to 3 carbon atoms. Specific examples of the alkyl group represented by $R^{3b}$ include a methyl group and an ethyl group.

n3 in the formula (13) represents an integer from 4 to 50, more preferably 5 to 40, and even more preferably 10 to 30.

The ionic water-soluble group used in the present invention is preferably a group selected from the group consisting of a carboxyl group, a sulfo group, a phosphate group, a phosphonate group, and salts thereof, and quaternary ammonium salts. Examples of the salts include metal salts and onium salts.

The ionic water-soluble group is more preferably a group selected from the group consisting of a carboxyl group, a sulfo group, a phosphate group, a phosphonate group and salts thereof; more preferably a group selected from the group consisting of a carboxyl group, a sulfo group and salts thereof; and particularly preferably a carboxyl group and salts thereof.

The metal salts of a carboxyl group are preferably alkali metal salts of a carboxyl group. Specific examples include —COOLi, —COONa, and —COOK, and preferred examples include —COONa and —COOK.

Examples of the onium salts of a carboxyl group include ammonium salts, pyridinium salts, and phosphonium salts of a carboxyl group, and the onium salts are preferably ammonium salts. Specific examples include tetraalkylammonium salts of a carboxyl group and trialkylarylammonium salts of a carboxyl group, and preferred examples include tetraalkylammonium salts of a carboxyl group. The alkyl group that forms an ammonium salt is preferably an alkyl group having 1 to 4 carbon atoms, and the aryl group is preferably a phenyl group.

The metal salts of a sulfo group are preferably alkali metal salts of a sulfo group. Specific examples include —$SO_3Li$, —$SO_3Na$, and —$SO_3K$, and preferred examples include —$SO_3Na$ and —$SO_3K$.

Examples of the onium salts of a sulfo group include ammonium salts, pyridinium salts, and phosphonium salts of a sulfo group, and the onium salts are preferably ammonium salts. Specific examples include tetraalkylammonium salts of a sulfo group and trialkylarylammonium salts of a sulfo group, and preferred examples include tetraalkylammonium salts of a sulfo group. The alkyl group that forms an ammonium salt is preferably an alkyl group having 1 to 4 carbon atoms, and the aryl group is preferably a phenyl group.

The metal salts of a phosphate group are preferably alkali metal salts of a phosphate group. Specific examples include sodium salts and potassium salts of a phosphate group, and preferred examples include sodium salts of a phosphate group.

Examples of the onium salts of a phosphate group include ammonium salts, pyridinium salts, and phosphonium salts of a phosphate group, and the onium salts are preferably ammonium salts. Specific examples include tetraalkylammonium salts of a phosphate group and trialkylarylammonium salts of a phosphate group, and preferred examples include tetraalkylammonium salts of a phosphate group. The alkyl group that forms an ammonium salt is preferably an alkyl group having 1 to 4 carbon atoms, and the aryl group is preferably a phenyl group.

The metal salts of a phosphonate group are preferably alkali metal salts of a phosphonate group. Specific examples include sodium salts and potassium salts of a phosphonate group, and preferred examples include sodium salts of a phosphonate group.

Examples of the onium salts of a phosphonate group include ammonium salts, pyridinium salts, and phosphonium salts of a phosphonate group, and the onium salts are preferably ammonium salts. Specific examples include tetraalkylammonium salts of a phosphonate group and trialkylarylammonium salts of a phosphonate group, and preferred examples include tetraalkylammonium salts of a phosphonate group. The alkyl group that forms an ammonium salt is preferably an alkyl group having 1 to 4 carbon atoms, and the aryl group is preferably a phenyl group.

Examples of the quaternary ammonium salts include salts composed of a quaternary ammonium ion and a halide ion; salts composed of a quaternary ammonium ion and an organic anion such as a sulfonate ion, a phosphate ion or a phosphonate ion; and salts composed of a quaternary ammonium ion and an anion containing fluorine atoms such as $BF_4^-$, $PF_6^-$, and $SbF_6^-$. Preferred examples include salts composed of a quaternary ammonium ion and a halide ion.

The quaternary ammonium ion is preferably an ion having a trialkylammonium structure, and the alkyl group preferably has 1 to 10 carbon atoms, and more preferably 1 to 5 carbon atoms. Specifically, an ion having a trimethylammonium structure or a triethylammonium structure is preferred.

Specific examples of the quaternary ammonium salts include —$N^+(CH_3)_3Cl^-$, —$N^+(C_2H_5)_3Cl^-$, and —$N^+(C_4H_9)_3Cl^-$, and preferred examples include —$N^+(CH_3)_3Cl^-$ and —$N^+(C_2H_5)_3Cl^-$.

In addition, when the ink composition of the present invention contains water, it is preferable that the (Component A) have a repeating unit (a4) having a water-soluble group. The number of the water-soluble groups in the (Component A) is not limited, and for example, there may be one such group or plural groups. The number is appropriately selected in accordance with the type, molecular weight and the like of the water-soluble group. When there are plural water-soluble groups present, they may be identical with or different from each other.

When the (Component A) contains the repeating unit (a4) having a water-soluble group, the (Component A) preferably has any one structure of the following formulae (AP-C1), (AP-C2), (AP-C3), and (AP-C4). Particularly, it is preferable that the (Component A) have the structure of formula (AP-C1).

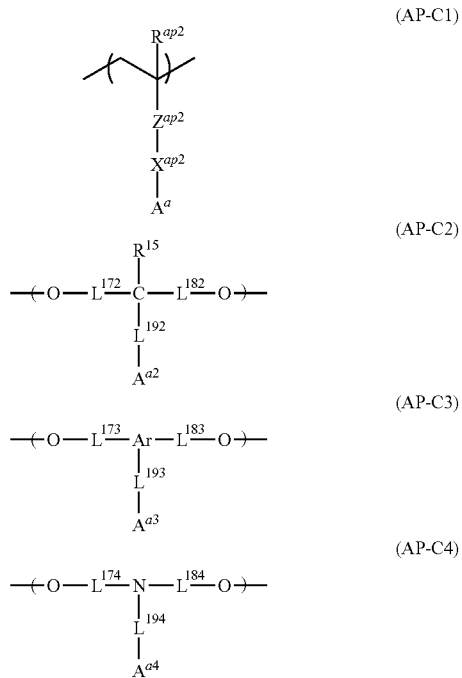

In the formula (AP-C1), $R^{ap2}$ represents a hydrogen atom or a methyl group; $Z^{ap2}$ represents —COO—, —$CONR^{ax2}$— or a single bond; $R^{ax2}$ represents a hydrogen atom or an alkyl group having 1 to 4 carbon atoms; $X^{ap2}$ represents a group selected from the group consisting of a single bond, an alkylene group, an arylene group and an aralkylene group; and $A^a$ represents a water-soluble group.

In the formula (AP-C1), $R^{ap2}$ represents a hydrogen atom or a methyl group, and is preferably a methyl group.

In the formula (AP-C1), $Z^{ap2}$ represents —COO—, —$CONR^{ax2}$— or a single bond, and is preferably —COO—. $R^{ax2}$ represents a hydrogen atom or an alkyl group having 1 to 4 carbon atoms. The alkyl group having 1 to 4 carbon atoms may have a linear structure or a branched structure. Specific examples include a methyl group, an ethyl group, a propyl group, an isopropyl group, a butyl group, an isobutyl group, a sec-butyl group, and a t-butyl group. $R^{ax2}$ is preferably a hydrogen atom or an alkyl group having 1 to 2 carbon atoms, namely, a methyl group or an ethyl group, and is particularly preferably a hydrogen atom. Meanwhile, $R^{ax2}$ may be substituted or may not be substituted, but it is preferable that $R^{ax2}$ have no substituent.

Examples of the substituent that may be carried by $R^{ax2}$ include an aryl group having 1 to 8 carbon atoms, an alkoxy group having 1 to 8 carbon atoms, a hydroxyl group, a carboxyl group, and a halogen atom (F, Cl, Br, I, or the like).

In the formula (AP-C1), $X^{ap2}$ represents a single bond, or a group selected from the group consisting of an alkylene group, an arylene group and an aralkylene group, and $X^{ap2}$ is preferably an alkylene group having 1 to 20 carbon atoms, an arylene group having 6 to 20 carbon atoms, or an aralkylene group having 7 to 20 carbon atoms. These groups may be substituted or may not be substituted. Furthermore, these groups may have an ether bond, an ester bond, an amide bond, or a urethane bond in the molecule. In the formula (AP-C1), $X^{ap2}$ is preferably a single bond.

Examples of the substituent that may be carried by $X^{ap2}$ include an aryl group having 1 to 8 carbon atoms, an alkoxy group having 1 to 8 carbon atoms, a hydroxyl group, a carboxyl group, and a halogen atom (F, Cl, Br, I or the like).

When $X^{ap2}$ is an alkylene group having 1 to 20 carbon atoms, the alkylene group may have a linear structure, a branched structure or a cyclic structure. The carbon number in the case where $X^{ap2}$ is an alkylene group is more preferably 2 to 12, and even more preferably 2 to 8. Specific examples of the alkylene group for $X^{ap2}$ include —CH$_2$—, —C$_2$H$_4$—, —C(CH$_3$)$_2$—CH$_2$—, —CH$_2$C(CH$_3$)$_2$CH$_2$—, —C$_6$H$_{12}$—, —C$_4$H$_7$(C$_4$H$_9$)C$_4$H$_8$—, —C$_{18}$H$_{36}$—, a 1,4-trans-cyclohexylene group, —C$_2$H$_4$—OCO—C$_2$H$_4$—, —C$_2$H$_4$—OCO—, —C$_2$H$_4$—O—C$_5$H$_{10}$—, —CH$_2$—O—C$_5$H$_9$(C$_5$H$_{11}$)—, —C$_2$H$_4$—CONH—C$_2$H$_4$—, —C$_4$H$_8$—OCONH—C$_6$H$_{12}$—, —CH$_2$—OCONHC$_{10}$H$_{20}$—, and —CH$_2$CH(OH)CH$_2$—.

When $X^{ap2}$ is an arylene group having 6 to 20 carbon atoms, the carbon number of the arylene group is preferably 6 to 18, more preferably 6 to 14, and particularly preferably 6 to 10. Specific examples of the arylene group for $X^{ap2}$ include a phenylene group, a biphenylene group, —C$_6$H$_4$—CO—C$_6$H$_4$—, and a naphthylene group.

When $X^{ap2}$ is an aralkylene group having 7 to 20 carbon atoms, the carbon number of the aralkylene group is preferably 7 to 18, more preferably 7 to 14, and particularly preferably 7 to 10. Specific examples of the aralkylene group include —C$_3$H$_6$—C$_6$H$_4$—, —C$_2$H$_4$—C$_6$H$_4$—C$_6$H$_4$—, —CH$_2$—C$_6$H$_4$—C$_6$H$_4$—C$_2$H$_4$—, and —C$_2$H$_4$—OCO—C$_6$H$_4$.

The water-soluble group represented by $A^a$ have the same examples, as well as the same preferred examples, as the water-soluble group described above.

In the formula (AP-C1), it is preferable that $R^{ap2}$ be a hydrogen atom; $Z^{ap2}$ be —COO—; $X^{ap2}$ be a single bond, an alkylene group having 2 to 8 carbon atoms, or an arylene group having 6 to 10 carbon atoms; and $A^a$ be a carboxyl group, a sulfo group or a salt thereof.

In the formulae (AP-C2), (AP-C3) and (AP-C4), $A^{a2}$, $A^{a3}$ and $A^{a4}$ each independently represent a water-soluble group, and have the same examples, as well as the same preferred examples, as the water-soluble group described above. The water-soluble group is particularly preferably a carboxyl group or a salt thereof.

In the formulae (AP-C2), (AP-C3) and (AP-C4), $L^{172}$, $L^{173}$, $L^{174}$, $L^{182}$, $L^{183}$, $L^{184}$, $L^{192}$, $L^{193}$, and $L^{194}$ each independently represent a single bond, or a divalent aliphatic or aromatic hydrocarbon group which may be substituted with a substituent (for example, the respective groups of alkyl, aralkyl, aryl, alkoxy, and halogen are preferred). $L^{172}$, $L^{173}$, $L^{174}$, $L^{182}$, $L^{183}$, $L^{184}$, $L^{192}$, $L^{193}$, and $L^{194}$ are each independently preferably an alkylene group having 1 to 20 carbon atoms, or an arylene group having 6 to 15 carbon atoms, and more preferably an alkylene group having 1 to 8 carbon atoms. Furthermore, if necessary, $L^{172}$, $L^{173}$, $L^{174}$, $L^{182}$, $L^{183}$, $L^{184}$, $L^{192}$, $L^{193}$, and $L^{194}$ may also have another functional group which does not react with an isocyanate group, for example, a carbonyl, ester, urethane, amide, ureido, or ether group. Meanwhile, any two or three among $R^{15}$, $L^{172}$, $L^{182}$, and $L^{192}$ may form a ring.

Here, $L^{172}$, $L^{173}$, $L^{174}$, $L^{182}$, $L^{183}$, $L^{184}$, $L^{192}$, $L^{193}$, and $L^{194}$ may be identical with or different from each other.

In the formula (AP-C2), $R^{15}$ represents a hydrogen atom, or an alkyl group, an aralkyl group, an aryl group, an alkoxy group or an aryloxy group, which may be each substituted with a substituent (including, for example, various groups such as a cyano group, a nitro group, a halogen atom such as —F, —Cl, —Br, or —I, —CONH$_2$, —COOR$^{16}$, —OR$^{16}$, —NHCONHR$^{16}$, —NHCOOR$^{16}$, —NHCOR$^{16}$, and —OCONHR$^{16}$ (wherein R$^{16}$ represents an alkyl group having 1 to 10 carbon atoms or an aralkyl group having 7 to 15 carbon atoms). $R^{15}$ is preferably a hydrogen atom, an alkyl group having 1 to 8 carbon atoms or an aryl group having 6 to 15 carbon atoms.

In the formula (AP-C3), Ar represents a trivalent aromatic hydrocarbon group which may be substituted. The carbon number of the aromatic hydrocarbon group is preferably 6 to 15.

In the formulae (AP-C2), (AP-C3) and (AP-C4), when $A^{a2}$, $A^{a3}$ and $A^{a4}$ are carboxyl groups, the diol compound that is used as a raw material of the repeating units is not particularly limited, and can be appropriately selected according to the purpose. Examples thereof include 3,5-dihydroxybenzoic acid, 2,2-bis(hydroxymethyl)propionic acid, 2,2-bis(2-hydroxyethyl)propionic acid, 2,2-bis(3-hydroxypropyl)propionic acid, bis(hydroxymethyl)acetic acid, bis(4-hydroxyphenyl)acetic acid, 2,2-bis(hydroxymethyl)butyric acid, 4,4-bis(4-hydroxyphenyl)pentanoic acid, tartaric acid, N,N-dihydroxyethylglycine, and N,N-bis(2-hydroxyethyl)-3-carboxypropionamide.

The structure represented by the formula (AP-C1) can be obtained by polymerizing a monomer represented by formula (AP-C-M).

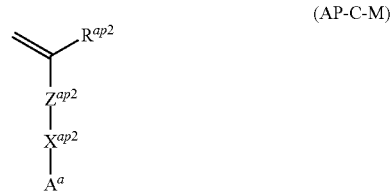

(AP-C-M)

In the formula (AP-C-M), $R^{ap2}$, $Z^{aP2}$, $X^{ap2}$, and $A^a$ have the same meanings, as well as the same preferred examples, as $R^{ap2}$, $Z^{ap2}$, $X^{ap2}$, and $A^a$ in the formula (AP-C1).

Preferred examples of the monomer represented by the formula (AP-C-M) include the following compounds (AP-C-M1) to (AP-C-M27), but the present invention is not intended to be limited to these.

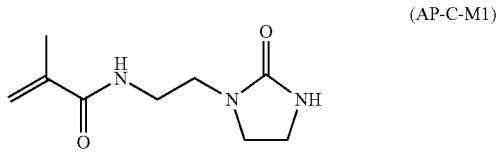

(AP-C-M1)

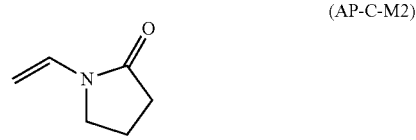

(AP-C-M2)

(AP-C-M3)

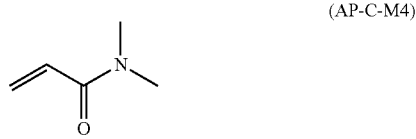

(AP-C-M4)

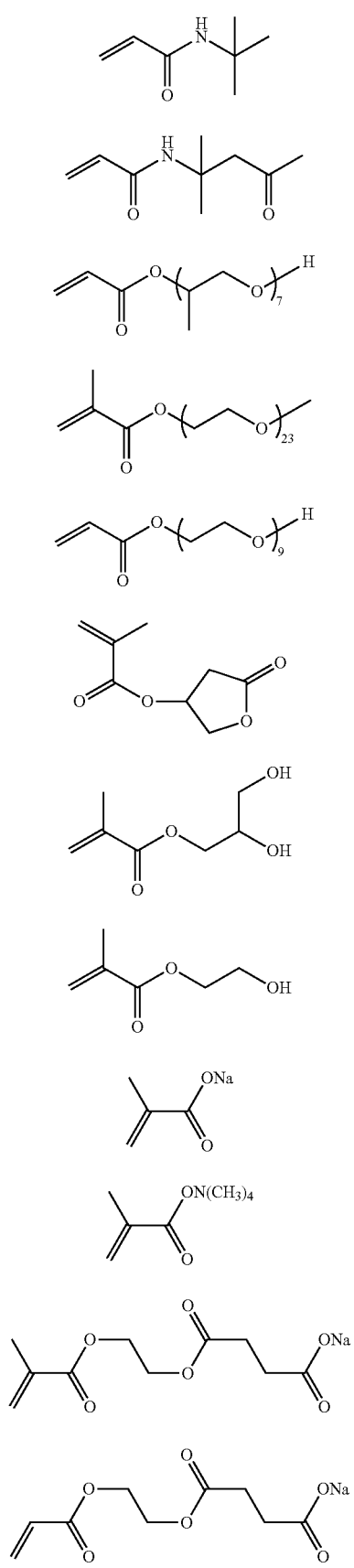
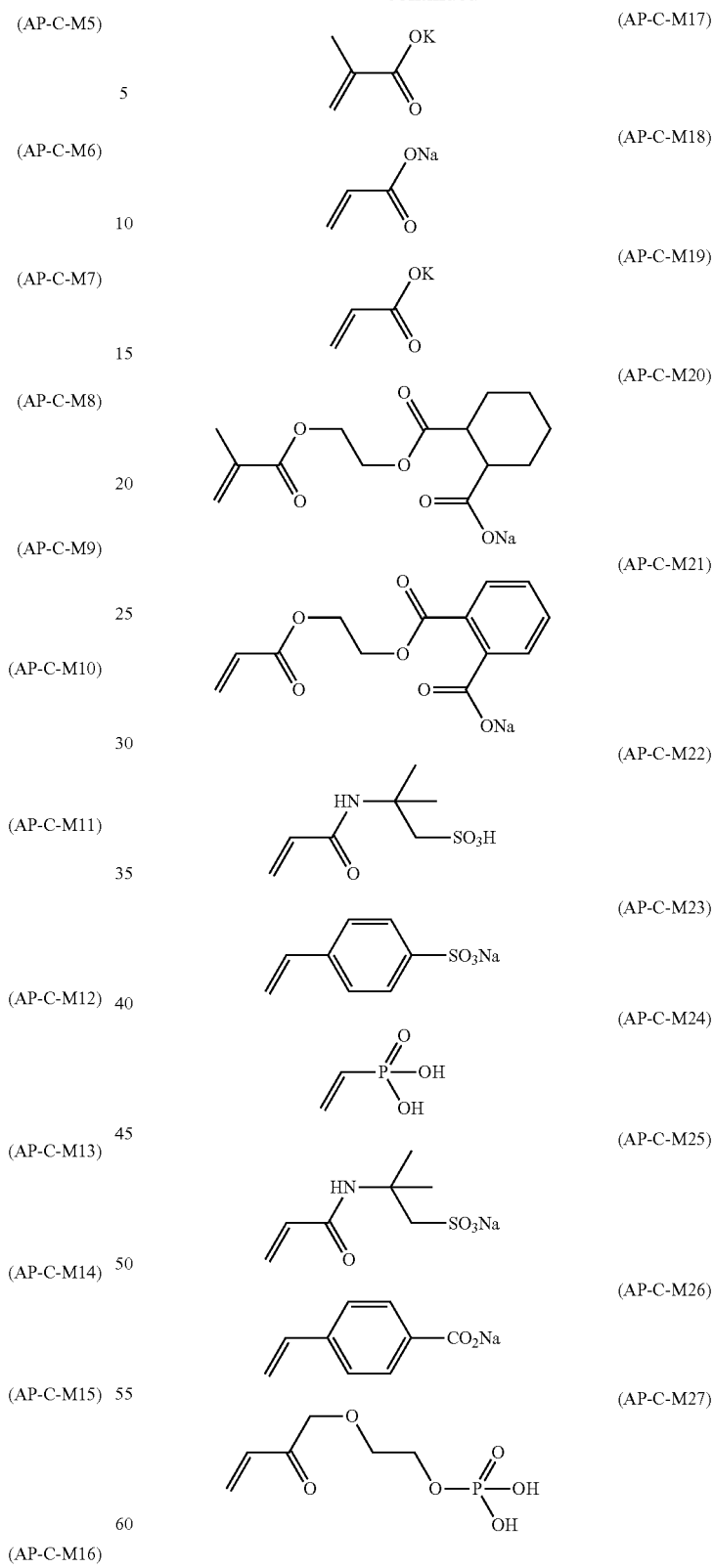
Examples of the (Component A) of the present invention described thus far include the following compounds, but the present invention is not intended to be limited thereto. Meanwhile, the numerical values in the formulas represent the ratios of the respective repeating units (molar basis).

(A-1)
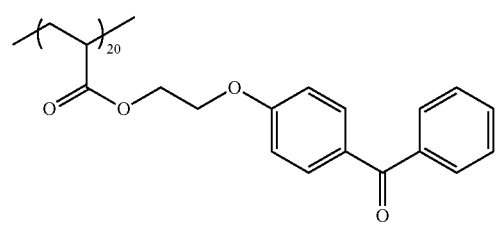
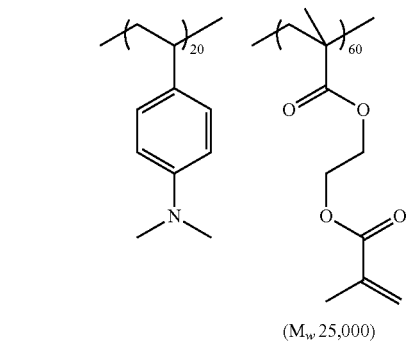
($M_w$ 25,000)
(A-2)
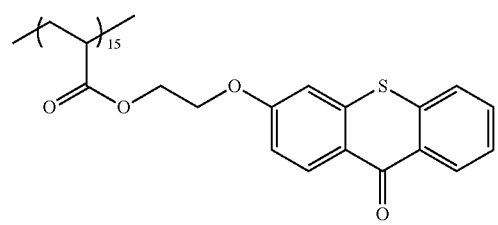
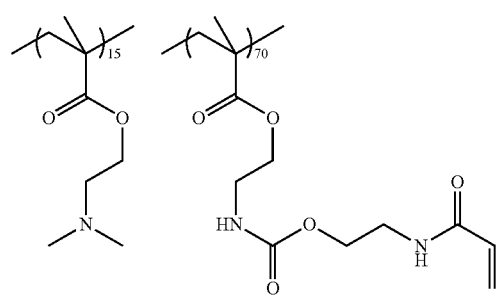
($M_w$ 21,000)
(A-3)
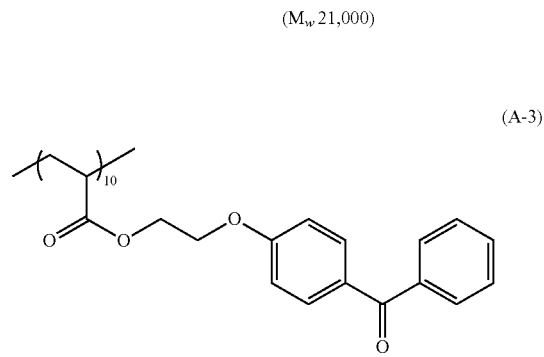
-continued
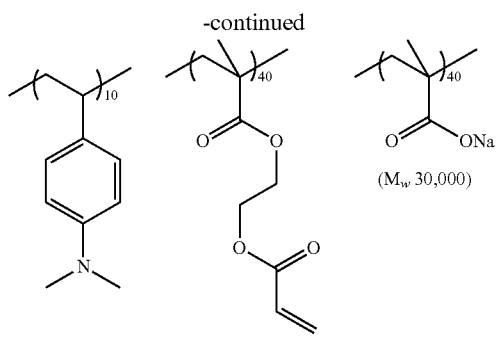
($M_w$ 30,000)
(A-4)
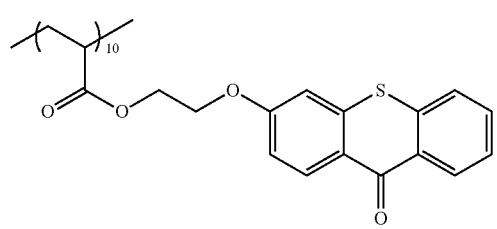
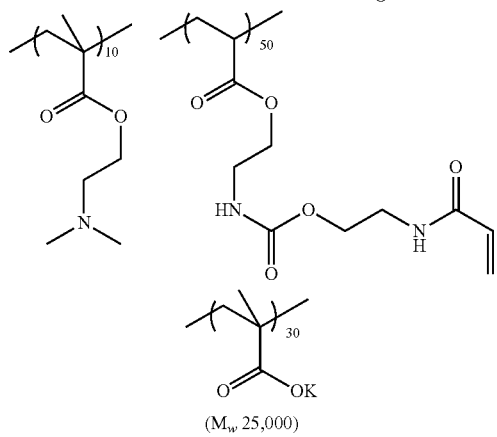
($M_w$ 25,000)
(A-5)
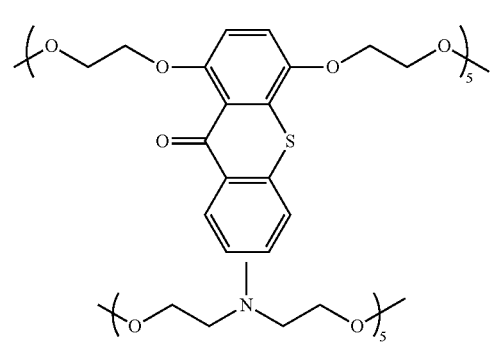
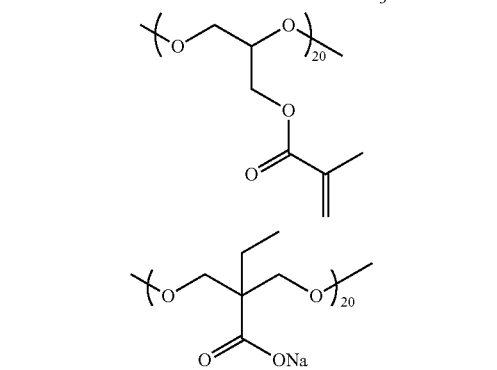

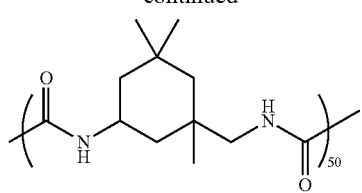

$M_w$ 24,000

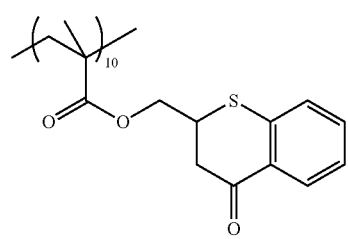

(A-6)

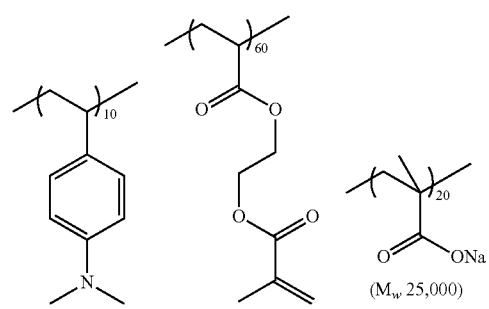

(M_w 25,000)

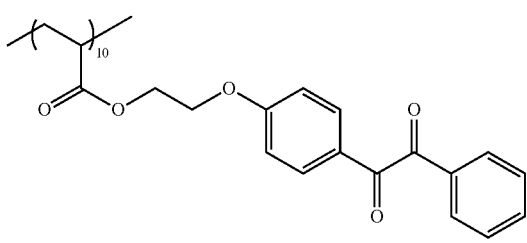

(A-7)

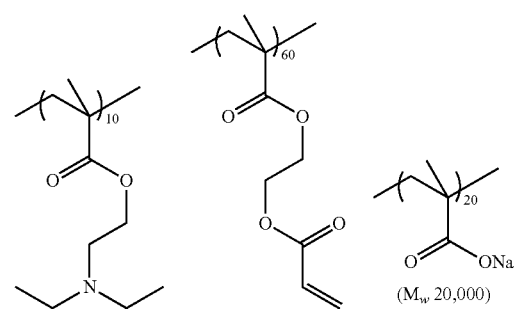

(M_w 20,000)

(A-8)

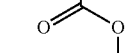
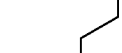
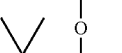
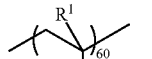
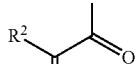

($M_w$ 27,000)

The (Component A) or a precursor thereof according to the present invention can be produced by generally known conventional methods. Polymer compounds such as the exemplary compounds can be obtained by polymerizing precursors described above by a known polymerization method, and neutralizing the acidic groups with a hydroxide of an alkali metal as necessary, and can be produced by, for example, a method equivalent to the polymerization method described in JP 2010-209183 A or the like.

The content of the (Component A) in the ink composition is preferably 1 mass % to 50 mass %, more preferably 2 mass % to 40 mass %, and even more preferably 3 mass % to 30 mass %.

<(Component B) Coloring Material>

The ink composition of the present invention contains (Component B) a coloring material.

There are no particular limitations on the coloring material that can be used in the present invention, and the coloring material can be arbitrarily selected from known coloring materials such as pigments, water-soluble dyes and disperse dyes, and used. Among these, the coloring material more preferably includes a pigment, from the viewpoint of having excellent weather resistance and rich color reproducibility.

(Pigment)

The pigment is not particularly limited, and can be appropriately selected according to the purpose. Examples include known organic pigments and inorganic pigments, and resin particles dyed with a dye, a commercially available pigment dispersion or a surface-treated pigment (for example, a product obtained by dispersing a pigment with a dispersant such as water, a liquid organic compound or an insoluble resin, and a product obtained by treating the surface of a pigment with a resin or a pigment derivative) may also be used. For example, those products described in Seishirou Ito, ed., "Encyclopedia of Pigments" (2000, published by Asakura Shoten K.K.), Isao Hashimoto, "Handbook of Organic Pigments" (2006, published by Color Office), W. Herbst and K. Hunger, ed., "Industrial Organic Pigments" (1992, published by Wiley-VHC), JP 2002-12607 A, JP 2002-188025 A, JP 2003-26978 A, JP 2003-342503 A, and JP 2009-235370 A.

Specific examples of the organic pigments and inorganic pigments that can be used in the present invention include the compounds described in paragraphs [0126] to [0131] of JP 2008-13646 A, and these compounds can also be applied to the present invention.

It is preferable to select the pigment, the dispersant and the medium, and to set the dispersion conditions and filtration conditions such that a volume average particle size of the pigment particles of preferably 0.005 µm to 0.5 µm, more preferably 0.01 µm to 0.45 µm, and even more preferably 0.015 µm to 0.4 µm, may be obtained. When the average particle size is set to the range described above, the effects of the present invention can be further enhanced.

Meanwhile, according to the present invention, the average particle size and particle size distribution of the particles can be determined by measuring the volume average particle size by a dynamic light scattering method using a commercially available particle size analyzer such as a NanoTrack particle size distribution analyzer, UPA-EX150 (manufactured by Nikkiso Co., Ltd.

(Water-Soluble Dye)

Next, a dye that may be preferably used as a coloring material according to the present invention will be described.

The dye can be appropriately selected from conventionally known compounds (dyes) and used. Specific examples include the compounds described in paragraphs [0023] to of JP 2002-114930 and paragraphs [0136] to [0140] of JP 2008-13646 A, and these compounds can also be applied to the present invention.

(Disperse Dye)

Furthermore, according to the present invention, a disperse dye can also be used.

Specific preferred examples of the disperse dye include C.I. Disperse Yellow 5, 42, 54, 64, 79, 82, 83, 93, 99, 100, 119, 122, 124, 126, 160, 184:1, 186, 198, 199, 201, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6: 1 and 9.

The coloring materials that can be used may be used individually, or two or more may be used in combination.

The content of the (Component B) in the ink composition can be appropriately selected depending on the properties of the coloring material (specific gravity, coloring power or color tone), and appropriate conditions for combining colors to prepare the ink composition to produce print materials. However, the content of the coloring material is preferably 0.1 mass % to 30 mass %, more preferably 0.5 mass % to 20 mass %, based on the total mass of the ink composition.

(Dispersant)

When a pigment is used as the coloring material, a pigment dispersant may be used as necessary when pigment particles are produced, and examples of the pigment dispersant that can be used include active agents such as higher fatty acid salts, alkylsulfates, alkyl ester sulfates, alkyl sulfonates, sulfosuccinates, naphthalenesulfonates, alkylphosphates, polyoxyalkylene alkyl ether phosphates, polyoxyalkylene alkyl phenyl ethers, polyoxyethylene polyoxypropylene glycol, glycerin esters, sorbitan esters, polyoxyethylene fatty acid amides, and amine oxides; and block copolymers or random copolymers formed from two or more monomers selected from styrene or a styrene derivative, a vinylnaphthalene derivative, acrylic acid, an acrylic acid derivative, maleic acid, a maleic acid derivative, itaconic acid, an itaconic acid derivative, fumaric acid and a fumaric acid derivative, and salts thereof.

Furthermore, the ink composition of the present invention can also use a self-dispersing pigment. The self-dispersing pigment as used in the present invention refers to a pigment which is capable of dispersing without a dispersant, and particularly preferably, pigment particles having polar groups on the surface.

The pigment particles having polar groups on the surface as used in the present invention refer to a pigment obtained by directly modifying the surfaces of the pigment particles with polar groups, or a pigment in which polar groups are bonded directly or through joints to an organic substance having a mother nucleus of an organic pigment (hereinafter, referred to as a pigment derivative).

Examples of the polar groups include a sulfonate group, a carboxylate group, a phosphate group, a borate group and a hydroxyl group, and preferred examples include a sulfonate group and a carboxylate group, while more preferred examples include a sulfonate group.

Examples of the method for obtaining such pigment particles having polar groups on the surface include methods of introducing polar groups such as sulfonate groups or salts thereof to at least a portion of the pigment surface by oxidizing the pigment particle surface with an appropriate oxidizing agent, as described in WO 97/48769, JP 1998-110129 A (JP-H10-110129 A), JP 1999-246807 A (JP-H11-246807 A), JP 1999-57458 A (JP-H11-57458 A), JP 1999-189739 A (JP-H11-189739 A), JP 1999-323232 A (JP-H11-323232 A), JP 2000-265094 A and the like. Specifically, such pigment particles can be produced by oxidizing carbon black with concentrated nitric acid. Furthermore, in the case of a color pigment, pigment particles can be produced by oxidizing pigments with sulfamic acid, sulfonated pyridine salts, amidosulfuric acid or the like in sulfolane or N-methyl-2-pyrrolidone. In these reactions, pigment dispersions can be obtained by removing any pigment that has been excessively oxidized and has become water-soluble, and purifying the remaining product. Furthermore, when sulfonic acid groups are introduced into the surface by oxidization, the acidic groups may be neutralized with basic compounds as necessary.

Other examples of the method for obtaining pigment particles having polar groups on the surface include methods of adsorbing a pigment derivative to the surface of pigment particles by treatments such as milling, as described in JP 1999-49974 A (JP-H11-49974 A), JP 2000-273383 A, and JP 2000-303014 A; and methods of dissolving a pigment together with a pigment derivative in a solvent, and then crystallizing the pigment in a poor solvent, as described in JP 2000-377068, JP 2001-1495, and JP 2001-234966. Any of these methods can easily produce pigment particles having polar groups on the surface.

The polar groups on the pigment surface may be in a free form, may be in a salt form, or may have a counter salt. Examples of the counter salt include inorganic salts (lithium, sodium, potassium, magnesium, calcium, aluminum, nickel and ammonium), and organic salts (triethylammonium, diethylammonium, pyridinium, and triethanolammonium), and preferred examples include monovalent counter salts.

As a method for dispersing a pigment, for example, various dispersing machines such as a ball mill, a sand mill, an attriter, a roll mill, an agitator, a Henschel mixer, a colloid mill, an ultrasonic homogenizer, a pearl mill, a wet jet mill, and a paint shaker can be used. Furthermore, for the purpose of removing coarse particles of the pigment dispersion, it is also preferable to use a centrifuge or to use a filter.

In regard to a preferable amount of the dispersant to be added in the ink composition, when the mass of the pigment in the ink composition is designated as P, and the amount of the polymeric dispersant in the ink composition is designated as D, the mass ratio (D/P) is preferably such that $0.01 \leq D/P \leq 2.0$, more preferably $0.03 \leq D/P \leq 1.5$, and even more preferably $0.05 \leq D/P \leq 0.6$.

Furthermore, it is also preferable to add, at the time of dispersion, in addition to the dispersant, dispersion aids that are generally called synergists (for example, Solsperse series 5000, 12000 and 22000 commercially available from Lubrizol Corp.; and EFKA 6745 commercially available from Ciba Specialty Chemicals Corp.), various surfactants and defoamants, and to thereby enhance pigment dispersibility and wettability.

According to the present invention, when dispersion of a pigment is carried out, it is preferable to mix the pigment with a dispersant, subsequently add the mixture to a polar organic solvent, and disperse the mixture, or it is preferable to mix a polar organic solvent with a dispersant, subsequently add the pigment to the mixture, and disperse the mixture. For the dispersion, for example, various dispersing apparatuses such as a ball mill, a bead mill, a sand mill, a salt mill, an attritor, a roll mill, an agitator, a Henschel mixer, a colloid mill, an ultrasonic homogenizer, a pearl mill, a wet jet mill, and a paint shaker can be used. Among them, a bead mill dispersing apparatus is preferred because it has excellent dispersing properties.

For the beads used to perform bead mill dispersion, when beads having a volume average size of preferably 0.01 mm to 3.0 mm, more preferably 0.05 mm to 1.5 mm, and even more preferably 0.1 mm to 1.0 mm are used, a pigment dispersion having excellent stability can be obtained.

<Other Additives>

In the ink composition of the present invention, known additives can be used in combination, in addition to the essential components, (Component A) and (Component B), to the extent that the effects of the present invention are not impaired. Hereinafter, the additives that can be used in the ink composition will be described.

<(Component C) Organic Solvent>

According to a preferred embodiment of the present invention, the ink composition can further contain an organic solvent in combination, according to the purpose.

When the ink composition of the present invention contains water, the organic solvent is preferably a water-soluble organic solvent. Here, the water-soluble organic solvent means an organic solvent having a solubility in water at 25° C. of 10 mass % or greater.

Examples of the water-soluble organic solvent that can be used in the present invention include the following.

Alcohols (for example, methanol, ethanol, propanol, isopropanol, butanol, isobutanol, secondary butanol, tertiary butanol, pentanol, hexanol, cyclohexanol, and benzyl alcohol)

Polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, and 2-methylpropanediol)

Polyhydric alcohol ethers (for example, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether), Amines (for example, ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, and tetramethylpropylenediamine), Amides (for example, formamide, N,N-dimethylformamide, and N,N-dimethylacetamide)

Heterocycles (for example, 2-pyrrolidone, N-methyl-2-pyrrolidone, cyclohexylpyrrolidone, 2-oxazolidone, 1,3-dimethyl-2-imidazolidinone, γ-butyrolactone, and propion carbonate)

Sulfoxides (for example, dimethyl sulfoxide),

Sulfones (for example, sulfolane), and

Others (urea, acetonitrile, acetone, and the like)

Preferred examples of the water-soluble organic solvent include polyhydric alcohol ethers and heterocycles, and it is preferable to use these in combination. As the polyhydric alcohol ethers, so-called glycol ethers are preferable, and specifically, tripropylene glycol monomethyl ether, dipropylene glycol monomethyl ether, and dipropylene glycol dimethyl ether are preferable. As the heterocycles, 2-pyrrolidone, γ-butyrolactone and the like are preferable, and 2-pyrrolidone is particularly preferable. Particularly, a solvent having a high boiling point can be preferably used from the viewpoint of enhancing dischargeability, and a solvent having a boiling point of 120° C. or higher at normal pressure is preferable, while a solvent having a boiling point of 150° C. or higher is more preferable.

The organic solvents may be used individually, or plural solvents may be used in combination. The amount of the organic solvent to be added to the ink composition is 5 mass % to 95 mass % in total, preferably 30 mass % to 95 mass % in total, and particularly preferably 40 mass % to 90 mass % in total.

<(Component D) Water>

According to another preferred embodiment of the present invention, the ink composition contains water.

As the water, it is preferable to use ion-exchanged water, distilled water or the like, all of which do not contain impurities.

The content of water in the ink composition of the present invention is preferably 5 mass % to 95 mass %, more preferably 30 mass % to 95 mass %, and particularly preferably 40 mass % to 90 mass %.

According to another preferred embodiment of the present invention, the ink composition contains the (Component C) and (Component D) in addition to the (Component A) and (Component B).

When the ink composition contains the (Component C) and (Component D) in addition to the (Component A) and (Component B), the respective contents in the ink composition are preferably 1 mass % to 50 mass % of (Component A), 0.1 mass % to 30 mass % of (Component B), and 20 mass % to 98.9 mass % of (Components C+D); more preferably 2 mass % to 40 mass % of (Component A), 0.5 mass % to 25 mass % of (Component B), and 35 mass % to 97.5 mass % of (Components C+D); and particularly preferably 3 mass % to 30 mass % of (Component A), 0.5 mass % to 20 mass % of (Component B), and 50 mass % to 96.5 mass % of (Components C+D).

According to the present invention, when the ink composition contains the (Component C) and (Component D), the content ratio (mass basis) of the (Component C) and the (Component D) is preferably such that (Component C):(Component D)=1:0.1 to 1:20, more preferably 1:0.2 to 1:10, even more preferably 1:0.5 to 1:5, and most preferably 1:1 to 1:5.

(Surfactant)

The ink composition of the present invention can contain a surfactant. Examples of the surfactant that can be preferably used include anionic surfactants such as dialkylsulfosuccinates, alkylnaphthalenesulfonates, and fatty acid salts; nonionic surfactants such as polyoxyethylene alkyl ethers, polyoxyethylene alkyl aryl ethers, acetylene glycols, and polyoxyethylene-polyoxypropylene block copolymers; and cationic surfactants such as alkylamine salts, and quaternary ammonium salts. Particularly, anionic surfactants and nonionic surfactants can be preferably used.

Furthermore, according to the present invention, polymeric surfactants can also be used, and the following water-soluble resins may be mentioned as preferred polymeric surfactants, from the viewpoint of discharge stability. Preferred examples of the water-soluble resins include a styrene-acrylic acid-acrylic acid alkyl ester copolymer, a styrene-acrylic acid copolymer, a styrene-maleic acid-acrylic acid alkyl ester copolymer, a styrene-maleic acid copolymer, a styrene-methacrylic acid-acrylic acid alkyl ester copolymer, a styrene-methacrylic acid copolymer, a styrene-maleic acid half-ester copolymer, a vinylnaphthalene-acrylic acid copolymer, and a vinylnaphthalene-maleic acid copolymer.

(Latex)

The ink composition of the present invention can contain a latex. Examples of the latex that can be used in the present invention include latexes of a styrene-butadiene copolymer, polystyrene, an acrylonitrile-butadiene copolymer, an acrylic acid ester copolymer, polyurethane, a silicone-acrylic copolymer and an acryl-modified fluororesin. The latex may be a product in which polymer particles are dispersed using an emulsifier, or may be a so-called soap-free latex in which polymer particles are dispersed without using an emulsifier. Surfactants are frequently used as the emulsifier, but it is also preferable to use a polymer having a group that is soluble in water, such as a sulfonate group or a carboxylate group (for example, a polymer in which a solubilizing group is graft-bonded, or a polymer obtainable from a monomer having a solubilizing group and a monomer having an insoluble moiety).

The volume average particle size of the polymer particles in the latex used in the ink composition of the present invention is preferably equal to or greater than 10 nm to equal to or less than 300 nm, and more preferably equal to or greater than 10 nm and equal to or less than 100 nm. The average particle size of the polymer particles in the latex can be determined by commercially available particle size analyzers which utilize a light scattering method, an electrophoresis method, and a laser Doppler method.

When a latex is used in the ink composition of the present invention, it is preferable to add the latex in an amount of equal to or greater than 0.1 mass % and equal to or less than 20 mass % in terms of the amount of solids content, and it is particularly preferable to add the latex in an amount of equal to or greater than 0.5 mass % and equal to or less than 10 mass % in terms of the amount of solids content.

(Aqueous Polymer)

The ink composition of the present invention can contain an aqueous polymer which is different from the (Component A).

Preferred examples of the aqueous polymer include natural polymers, and specific examples thereof include proteins such as glue, gelatin, casein, and albumin; natural rubbers such as gum arabic and tragacanth; glucosides such as saponin; alginic acid derivatives such as alginic acid, alginic acid propylene glycol ester, triethanolamine alginate, and ammonium alginate; and cellulose derivatives such as methyl cellulose, carboxymethyl cellulose, hydroxyethyl cellulose, and ethylhydroxyl cellulose.

Other preferred examples of the aqueous polymer include synthetic polymers, and examples thereof include polyvinyl alcohols; polyvinylpyrrolidones; acrylic resins such as polyacrylic acid an acrylic acid-acrylonitrile copolymer, a potassium acrylate-acrylonitrile copolymer, a vinyl acetate-acrylic acid ester copolymer, and an acrylic acid-acrylic acid ester copolymer; styrene-acrylic acid resins such as a styrene-acrylic acid copolymer, a styrene-methacrylic acid copolymer, a styrene-methacrylic acid-acrylic acid ester copolymer, a styrene-α-methylstyrene-acrylic acid copolymer, and a styrene-α-methylstyrene-acrylic acid-acrylic acid ester copolymer; styrene-maleic acid resins such as a styrene-maleic acid copolymer, and a styrene-maleic anhydride copolymer; vinylnaphthalene resins such as a vinylnaphthalene-acrylic acid copolymer, and a vinylnaphthalene-maleic acid copolymer; and vinyl acetate copolymers such as a vinyl acetate-ethylene copolymer a vinyl acetate-fatty acid vinylethylene copolymer, a vinyl acetate-maleic acid ester copolymer, a vinyl acetate-crotonic acid copolymer, and a vinyl acetate-acrylic acid copolymer; and salts thereof. Among these, particularly preferred examples include polyvinylpyrrolidones.

The weight average molecular weight of the water-soluble polymer that can be used in the present invention is preferably equal to or greater than 1,000 and equal to or less than 200,000. Further, the weight average molecular weight is more preferably equal to or greater than 3,000 and equal to or less than 20,000.

The amount of the water-soluble polymer added is preferably equal to or greater than 10 mass % and equal to or less than 1,000 mass % based on the dissolved pigment. Further, the amount is more preferably equal to or greater than 50 mass % and equal to or less than 200 mass %.

(Polymerization Initiator)

It is preferable that the ink composition of the present invention do not contain a low molecular weight polymerization initiator, but the ink composition may contain a polymerization initiator to the extent that the effects of the present invention are not impaired. The polymerization initiator is preferably water-soluble, and in regard to the degree of water solubility, the polymerization initiator is preferably dissolved in distilled water at 25° C. in an amount of 0.5 mass % or more, preferably dissolved in an amount of 1 mass % or more, and particularly preferably dissolved in an amount of 3 mass % or more.

Furthermore, it is preferable to use a polymerization initiator selected from the group consisting of α-aminoketones and acylphosphine oxides.

Examples of the compound included in α-aminoketones include 2-methyl-1-phenyl-2-morpholinopropan-1-one, 2-methyl-1-[4-(hexyl)phenyl]-2-morpholinopropan-1-one, and 2-ethyl-2-dimethylamino-1-(4-morpholinophenyl)-butanone-1. Furthermore, the polymerization initiator can be obtained as commercially available products such as the Irgacure series manufactured by Ciba Geigy Corp., for example, Irgacure 907, Irgacure 369, and Irgacure 379, and these are also compounds included in α-aminoketones and can be suitably used in the present invention.

Examples of the compounds included in acylphosphine oxides include [2,4,6-trimethylbenzoyl-diphenyl phosphine oxide] available under the trade name: Darocur TPO (manufactured by BASF Japan, Ltd.), and [bis(2,4,6-trimethylbenzoyl)-phenylphosphine oxide] available under the trade name: Irgacure 819 (manufactured by BASF Japan, Ltd.).

When the ink composition of the present invention includes a polymerization initiator, the acylphosphine oxides described above are preferable, but as long as the effects of the present invention are not impaired, other polymerization initiators may also be used.

Furthermore, the polymerization initiator can also be used in combination with acylphosphine oxides. In this case, it is preferable to use a water-soluble polymerization initiator. The water-soluble initiator is preferably dissolved in distilled water at 25° C. in an amount of 0.5 mass % or more, preferably dissolved in an amount of 1 mass % or more, and particularly preferably dissolved in an amount of 3 mass % or more.

Examples of other known polymerization initiators that can be used include camphorquinone, benzophenone, benzophenone derivatives, acetophenone, acetophenone derivatives (for example, α-hydroxycycloalkylphenol ketones, 2-hydroxy-2-methyl-1-phenylpropanone, and dialkoxyacetophenones), α-hydroxy- or 4-aroyl-1,3-dioxolanes, benzoin alkyl ethers, benzyl ketals (for example, benzyl dimethyl ketal), phenyl glyoxalate and derivatives, phenyl glyoxalate dimer, peresters (for example, benzophenonetetracarboxylic acid peresters (for example, those described in EP 1,126, 541)), halomethyltriazines (for example, 2-[2-(4-methoxyphenyl)-vinyl]-4,6-bis-trichloromethyl[1,3,5]triazine, 2-(4-methoxyphenyl)-4,6-bistrichloromethyl[1,3,5]triazine, 2-(3, 4-dimethoxyphenyl)-4,6-bis-trichloromethyl[1,3,5]triazine, 2-methyl-4,6-bis-trichloromethyl[1,3,5]triazine), hexaarylbisimidazole/co-initiator systems (for example, ortho-chlorohexaphenylbisimidazole combined with 2-mercaptobenzothiazole, ortho-chlorohexaphenylbisimidazole combined with boric acid), ferrocenium compounds or titanocenes (for example, a mixture of dicyclopentadienylbis(2,6-difluoro-3-pyrrolophenyl)titanium, and for example, the O-acyloxime ester compound described in GB 2,339,571). Boric acid compounds can also be used as the co-initiator.

The content of the polymerization initiator in the ink composition of the present invention is preferably in the range of 0 to 10 parts by mass, more preferably 0 to 5 parts by mass, and even more preferably 0 to 3 parts by mass, based on 100 parts by mass of the ink composition. Meanwhile, the content of the polymerization initiator used herein means the total content of the polymerization initiator.

(Sensitizing Dye)

According to the present invention, it is preferable that the ink composition do not contain a low molecular weight sensitizer, but a known sensitizing dye can be used in combination. Preferred examples of the known sensitizing dye that can be used in combination include benzophenone and thioxanthone, and in particular, isopropylthioxanthone, anthraquinone, 3-acylcoumarin derivative, terphenyl, styryl ketone, 3-(aroylmethylene)thiazoline, camphorquinone, eosine, rhodamine, and erythrosine.

(Polymerizable Compound)

The ink composition of the present invention may contain a polymerizable compound other than the (Component A) (hereinafter, may be referred to as "specific polymerizable compound"). The polymerizable compound may be any water-soluble compound having at least one ethylenically unsaturated bond capable of radical polymerizable in the molecule, and those having a chemical form such as a monomer, an oligomer or a polymer are included. Only one kind of the specific polymerizable compound may be used, and in order to enhance the desired characteristics, two or more kinds may be used in combination at any ratio. Preferably, it is preferable to use two or more kinds in combination, in order to control performances such as reactivity and properties.

The polymerizable compound used in the present invention is preferably dissolved in distilled water at room temperature in an amount of 2 mass % or more, more preferably dissolved in an amount of 15 mass % or more, and particularly preferably mixed uniformly with water at any ratio.

Examples of the polymerizable compound include unsaturated carboxylic acids such as acrylic acid, methacrylic acid, itaconic acid, crotonic acid, isocrotonic acid, and maleic acid, and esters thereof, salts thereof, anhydrides having ethylenically unsaturated groups, acrylonitrile, styrene, unsaturated polyesters, unsaturated polyether, unsaturated polyamide, unsaturated urethane, vinyl ether, and aryl ether. Acrylic acid, methacrylic acid, and esters and salts thereof are preferred.

The polymerizable compound that can be used in the present invention preferably has a poly(ethyleneoxy) chain, a poly(propyleneoxy) chain, or an ionic group (for example, a carboxyl group, or a sulfo group), in order to impart water solubility. When the polymerizable compound has a poly(ethyleneoxy) chain or a poly(propyleneoxy) chain, the number of the ethyleneoxy units or the propyleneoxy units is preferably in the range of 1 to 10, and more preferably in the range of 1 to 5.

In order to further improve the sensitivity, bleeding, and adhesiveness to recording media, it is preferable to use a polyfunctional acrylate monomer or polyfunctional acrylate oligomer having a molecular weight of 400 or greater, and preferably 500 or greater, in combination with a monoacrylate, as the polymerizable compound. Particularly, in regard to an ink composition that is used for the recording on a flexible recording medium such as a polyethylene terephthalate (PET) film or a polypropylene (PP) film, the combined use of a monoacrylate and a polyfunctional acrylate monomer or a polyfunctional acrylate oligomer selected from the group of compounds described above is preferable because flexibility is imparted to the resulting film, and the film strength can be increased, while increasing the adhesiveness.

Furthermore, an embodiment in which at least three polymerizable compounds of a monofunctional monomer, a bifunctional monomer and a polyfunctional monomer having a valence of 3 or higher are used in combination is preferable from the viewpoint of further improving sensitivity, bleeding, and adhesiveness to recording media, while maintaining safety.

In the ink composition according to the present invention, if necessary, various known additives, for example, a viscosity adjusting agent, a surface tension adjusting agent, a specific resistance adjusting agent, a film-forming agent, an ultraviolet absorbent, an antioxidant, a discoloration preventing agent, an antifungal agent, an anti-rust agent, a solid lubricating agent, and silica fine particles can be appropriately selected and used in addition to the various constituent elements described above as necessary, according to the purpose of enhancing discharge stability, conformity with a print head or ink cartridge, storage stability, image preservability, and other general performances. Examples include oil droplet fine particles of liquid paraffin, dioctyl phthalate, tricresyl phosphate, silicone oil and the like; ultraviolet absorbents described in JP 1982-74193 A (JP-S-57-74193 A), JP 1982-

87988 A (JP-S-57-87988 A), and JP 1987-261476 A (JP-S-62-261476); discoloration preventing agents described in JP 1982-74192 A (JP-S-57-74192 A), JP 1982-87989 A (JP-S-57-87989 A), JP 1985-72785 A (JP-S-60-72785 A), JP 1986-146591 A (JP-S-61-146591 A), JP 1989-95091 A (JP-H-1-95091 A) and JP1991-13376 A (JP-H-3-13376 A); fluorescent whitening agents described in JP 1984-42993 A (JP-S-59-42993 A), JP 1984-52689 A (JP-S-59-52689 A), JP 1987-280069 A (JP-S-62-280069), JP 1986-242871 A (JP-S-61-242871A), and JP 1992-219266 A (JP-H-4-219266); and pH adjusting agents such as sulfuric acid, phosphoric acid, citric acid, sodium hydroxide, potassium hydroxide, and potassium carbonate.

<Method for Preparing Ink Composition>

The method for preparing the ink composition according to the present invention is not particularly limited, and the ink composition can be prepared by dispersing various components by stirring and mixing using a container-driven medium mill such as a ball mill, a centrifugal mill, or a planetary ball mill; a high speed rotating mill such as a sand mill; a medium stirring mill such as a stirring tank mill; or a simple dispersing machine such as a Disper. The order of adding the various components is arbitrary. Furthermore, in order to further micronize dispersed particles, the dispersion may be mixed using a dispersing machine such as a bead mill or a high pressure jet mill. Furthermore, depending on the type of the pigment or the polymeric dispersant, an anionic resin may also be added at the time of premixing before the dispersion of pigment.

The ink composition of the present invention preferably has a surface tension at 25° C. of 20 mN/m to 40 mN/m. The surface tension is measured under the conditions of 25° C. using an automatic surface tensiometer, CBVP-Z (manufactured by Kyowa Interface Science Co., Ltd.). Furthermore, the viscosity is preferably 1 mPa·s to 40 mPa·s, and more preferably 3 mPa·s to 30 mPa·s. The viscosity of the ink composition is measured under the conditions of 25° C. using a viscometer, TV-22 (manufactured by Told Sangyo Co., Ltd.).

<<Image Forming Method>>

The image forming method of the present invention is characterized by including an ink application step of applying the ink composition onto a recording medium, and an irradiation step of irradiating the ink composition with an active energy radiation. When these processes are carried out, an image based on the ink composition fixed on the recording medium is formed.

<Ink Application Step>

Hereinafter, the ink application step in the image forming method of the present invention will be described. The ink application step according to the present invention is not limited as long as it is a step of applying the ink composition onto a recording medium.

In the image forming method of the present invention, the ink application step is preferably carried out using an inkjet method. There are no particular limitations on the inkjet recording apparatus that can be used in the present invention, and any known inkjet recording apparatus capable of achieving a desired resolution can be arbitrarily selected and used. That is, any known inkjet recording apparatus including commercially available products can all perform discharge of the ink composition onto a recording medium by the image forming method of the present invention.

As the inkjet recording apparatus that can be used in the present invention, for example, an apparatus including an ink supplying system, a temperature sensor, and a heating means may be used.

The ink supply system includes, for example, a base tank containing the ink composition of the present invention, a supply pipe, an ink supply tank immediately before an inkjet head, a filter, and a piezo type inkjet head. The piezo type inkjet head can be driven so as to discharge multi-size dots of preferably 1 to 100 pl, and more preferably 8 to 30 pl, at a resolution of preferably 320×320 to 4,000×4,000 dpi, more preferably 400×400 to 1,600×1,600 dpi, and even more preferably 720×720 dpi. Meanwhile, the term dpi as used in the present invention represents the number of dots per 2.54 cm.

The ink composition of the present invention is such that since it is preferable to adjust the ink composition to be discharged to a constant temperature, it is preferable that the inkjet recording apparatus include a stabilization means for the ink composition temperature. The area to be set to a constant temperature includes all of the piping system and members from the ink tank (if an intermediate tank is present, up to the intermediate tank) to the nozzle injection plane. That is, insulation and heating can be carried out in the area extending from the ink supply tank to the inkjet head part.

The method of temperature control is not particularly limited, but for example, it is preferable to provide a plural number of temperature sensors at various piping areas and to control by heating in accordance with the flow rate of the ink composition and the environmental temperature. The temperature sensor can be provided in the vicinity of the ink supply tank and the nozzles of the inkjet head. Furthermore, the head unit to be heated is preferably thermally shielded or insulated so that the main body of the apparatus is not affected by the temperature of external air. In order to shorten the printer boot-up time required for heating, or in order to reduce the loss of heat energy, it is preferable to achieve insulation from other areas, and at the same time, to reduce the total thermal capacity of the heating means.

Discharge of the ink composition using the inkjet recording apparatus described above is preferably carried out after heating the ink composition preferably to 25° C. to 80° C., and more preferably to 25° C. to 50° C., and decreasing the viscosity of the ink composition preferably to 3 mPa·s to 15 mPa·s, and more preferably 3 mPa·s to 13 mPa·s. Particularly, when an ink composition having a viscosity of 50 mPa·s or less at 25° C. is used as the ink composition of the present invention, it is preferable because discharge can be satisfactorily carried out. When this method is used, high discharge stability can be realized.

It is preferable that the temperature of the ink composition at the time of discharge be maintained to be as constant as possible. According to the present invention, it is appropriate to set the range of control of the temperature of the ink composition to preferably (set temperature±5° C.), more preferably to (set temperature±2° C.), and even more preferably to (set temperature±1° C.).

According to the present invention, the recording medium is not particularly limited, and any recording medium known as a support or a recording material can be used. Examples of recording media include paper, paper laminated with plastics (for example, polyethylene, polypropylene, and polystyrene), metal plates (for example, plates of aluminum, zinc and copper), plastic films (for example, films of a polyvinyl chloride resin, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, and polyvinyl acetal), and paper or plastic films on which the above-mentioned metals are laminated or deposited. Among them, since the ink composition of the present invention has excellent adhesiveness, the ink composition can be suitably used on a nonabsorptive recording medium as the recording medium. From the viewpoint of adhesiveness, plastic base materials such as polyvinyl chloride, polyethylene terephthalate and polyethylene are preferred as the recording medium, and a polyvinyl chloride resin base material is more preferred, and a polyvinyl chloride resin sheet or film is even more preferred.

<Irradiation Step>

The irradiation step in the image forming method of the present invention will be described below. The irradiation step according to the present invention is not limited as long as it is a step of irradiating the ink composition applied on the recording medium with an active energy radiation. When the ink composition of the present invention is irradiated with an active energy radiation, the crosslinking reaction of the compounds in the ink composition proceeds, the image is fixed, and thus solvent resistance and the like of the print material can be enhanced.

Examples of the active energy radiation that can be used in the irradiation step include ultraviolet radiation (hereinafter, also referred to as UV light), visible radiation, and an electron beam, and it is preferable to use UV light.

The peak wavelength of the UV light depends on the absorption characteristics of the sensitizing dye that is optionally used, but for example, the peak wavelength is preferably 200 nm to 405 nm, more preferably 250 nm to 405 nm, and even more preferably 250 nm to 390 nm.

The output power of the UV light is preferably 2,000 $mJ/cm^2$ or less, more preferably 10 $mJ/cm^2$ to 2,000 $mJ/cm^2$, even more preferably 20 $mJ/cm^2$ to 1,000 $mJ/cm^2$, and particularly preferably 50 $ml/cm^2$ to 800 $mJ/cm^2$.

Furthermore, it is adequate for the UV light to be irradiated at an exposed surface illuminance of, for example, 10 $mW/cm^2$ to 2,000 $mW/cm^2$, and preferably 20 $mW/cm^2$ to 1,000 $mW/cm^2$.

As the UV light source, a mercury lamp, a gas/solid laser and the like are mainly used, and a mercury lamp and a metal halide lamp are widely known. Furthermore, replacement with GaN-based semiconductor ultraviolet emitting devices is very useful from industrial and environmental viewpoints, and light-emitting diodes (LED) (UV-LED) and laser diodes (LD) (UV-LD) are devices of small size, long service life, high efficiency and low cost, and are expected to be used as UV light sources.

The ink composition of the present invention is adequately irradiated with such UV light for, for example, 0.01 seconds to 120 seconds, and preferably 0.1 seconds to 90 seconds.

The irradiation conditions and fundamental irradiation methods are disclosed in JP 1985-132767 A (JP-S-60-132767 A). Specifically, a system in which light sources are provided on both sides of the head unit including an ink discharge apparatus, and the head unit and the light sources are scanned in a shuttling manner; or a system in which irradiation is carried out by a separate light source that is not driven may be provided, and irradiation being carried out by a separate light source that is not driven, is preferred. The irradiation of an active radiation is carried out after the impact of ink and heat fixing, after a certain time (for example, for 0.01 seconds to 60 seconds, preferably 0.01 seconds to 30 seconds, and more preferably 0.01 seconds to 15 seconds).

<Heating Drying Step>

It is preferable that the ink composition discharged on a recording medium be fixed as water and an organic solvent that are used in combination as necessary are evaporated by a heating means. The step of supplying heat to the discharged ink composition of the present invention and thereby fixing the ink composition will be described.

The heating means is not limited as long as it is capable of drying water and an organic solvent that are used in combination as necessary, but a heating drum, warm air, an ultraviolet lamp, a heating oven, a heating plate and the like can be used.

The heating temperature is not particularly limited as long as water and an organic solvent that are used in combination as necessary in the ink composition can evaporate, and a film of the (Component A) and the polymer binder that is optionally added can be formed. However, if the temperature is 40° C. or higher, the effect can be obtained. Thus, the heating temperature is preferably about 40° C. to 150° C., and more preferably about 40° C. to 80° C.

The drying/heating time is not particularly limited as long as water and an organic solvent that are used in combination as necessary in the ink composition can evaporate, and a film of the (Component A) and the like can be formed. The drying/heating time can be appropriately set by taking the composition of the ink composition used and the printing speed into consideration.

The ink composition fixed by heating can be irradiated with UV light and further light-fixed, according to necessity. It is preferable to perform fixing using UV light, in order to enhance the strength of the print material, water resistance, solvent resistance and the like.

<<Print Material>>

The print material of the present invention is characterized by being recorded according to the image forming method of the present invention. Since the print material of the present invention is a print material recorded according to the image forming method of the present invention, a print material which is excellent in solvent resistance, water resistance and adhesiveness to a base material is obtained.

EXAMPLES

Hereinafter, the present invention will be specifically described based on Examples, but the present invention is not intended to be limited to these Examples. Meanwhile, unless particularly stated otherwise, the units "parts" and "percent (%)" are on a mass basis.

The pigment dispersions and the components of the ink compositions used in Examples and Comparative Examples are shown below.

<Preparation of Coloring Material Dispersion A>

35 parts of IRGALITE BLUE GLVO (cyan pigment, C.I. Pigment Blue 15:3, manufactured by BASF Japan, Ltd.), 12.5 parts of Ajisper PB821 (polyester-based polymeric dispersant, manufactured by Ajinomoto Co., Inc.), and 52.5 parts of propylene carbonate (4-methyl-2-oxo-1,3-dioxolane, manufactured by Wako Pure Chemical Industries, Ltd.) were mixed, and the mixture was stirred with a stirrer until the mixture became uniform. The preliminary dispersion liquid thus obtained was further dispersed with a vertical type bead mill (Ready Mill manufactured by Imex Co., Ltd.), using 0.1-mm zirconia beads for 3 to 6 hours. Thus, a color material dispersion A was prepared. The volume average particle size of the color material in the color material dispersion A was measured by a dynamic light scattering method using a NanoTrack particle size distribution analyzer, UPA-EX150 (manufactured by Nikkiso Co., Ltd.), and the volume average particle size was 190 nm.

<Preparation of Coloring Material Dispersion B>

In a 500-ml three-necked flask equipped with a stirrer and a cooling condenser, 44 of methyl ethyl ketone was introduced and heated to 72° C. in a nitrogen atmosphere, and, a solution prepared by dissolving 0.43 g of dimethyl 2,2'-azobisisobutyrate, 30 g of benzyl methacrylate, 5 g of methacrylic acid, and 15 g of methyl methacrylate in 25 g of methyl ethyl ketone was added thereto dropwise over 3 hours. After completion of the dropwise addition, the reaction liquid was allowed to react for one hour, and then a solution prepared by dissolving 0.21 g of dimethyl 2,2'-azobisisobutyrate in 1 g of methyl ethyl ketone was added thereto. The mixture was heated to 78° C. and was heated for 4 hours. The reaction solution thus obtained was reprecipitated twice in a large excess of hexane, and a precipitated resin was dried. Thus, 43 g of a polymeric dispersant D-1 was obtained.

The composition of the resin thus obtained was confirmed by $^1$H-NMR, and the weight average molecular weight (Mw) determined by GPC was 42,000. Furthermore, the acid value was determined by the method described in the JIS standard (JIS K0070: 1992), and the acid value was 65.4 mg KOH/g.

10 parts of Pigment Blue 15:3 (Phthalocyanine Blue A220, manufactured by Dainichiseika Color & Chemicals Manufacturing Co., Ltd.), 5 parts of the polymeric dispersant D-1, 42 parts of methyl ethyl ketone, 5.5 parts of a 1 mol/L aqueous NaOH solution, and 87.2 parts of ion-exchanged water were mixed, and the mixture was dispersed for 2 to 6 hours with a bead mill using 0.1-mmϕ zirconia beads. Methyl ethyl ketone was removed from the dispersion thus obtained at 55° C. under reduced pressure, and a portion of water was further removed. Thereby, a coloring material dispersion B (coloring particles) having a pigment concentration of 10.2 mass % was obtained.

<Synthesis of (Component A)>

Synthesis of the (Component A) was carried out with reference to Eur. Polym. J., Vol. 23, No. 12, pp. 985-987, 1987, JP 2010-209183 A, WO 2010/029017, JP 1977-988 (JP-S-52-988), and the like. The compounds used in Examples are shown below. The numerical values in the formulae represent the ratios (molar basis) of the respective repeating units.

(A-1)

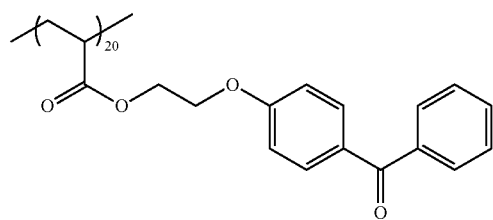

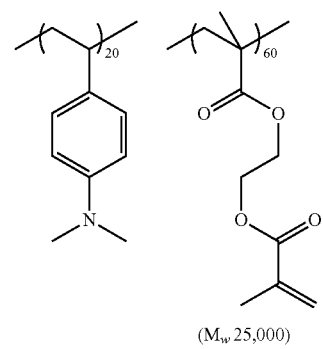

($M_w$ 25,000)

(A-2)

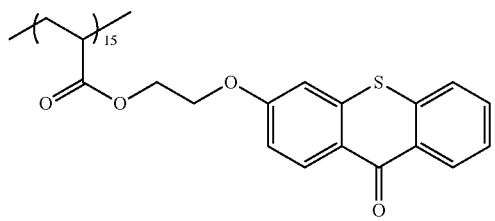

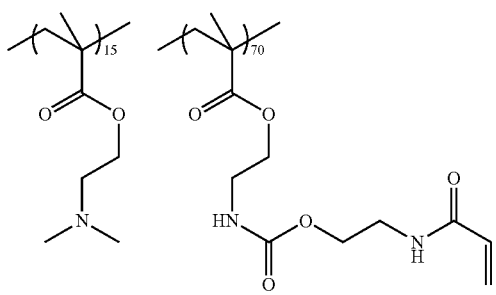

($M_w$ 21,000)

(A-3)

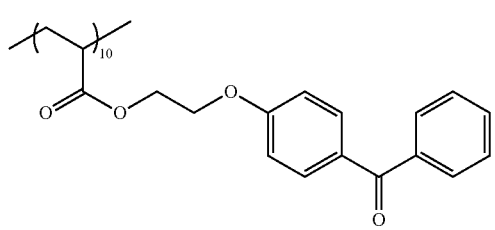

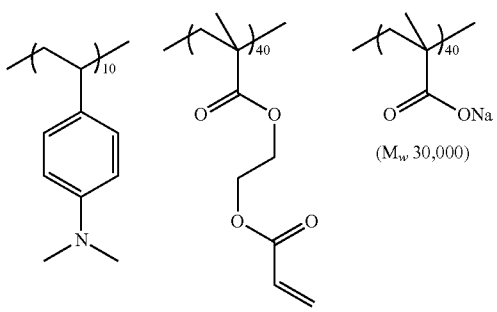

($M_w$ 30,000)

(A-4)

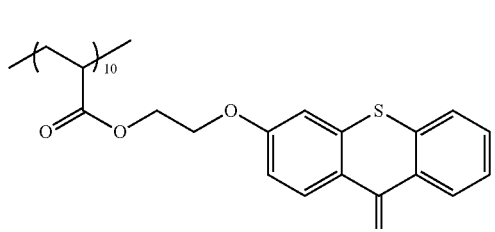

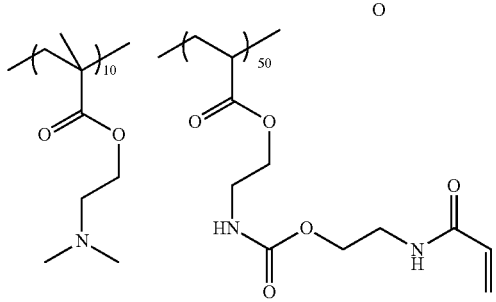

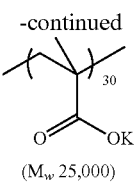

(A-5)

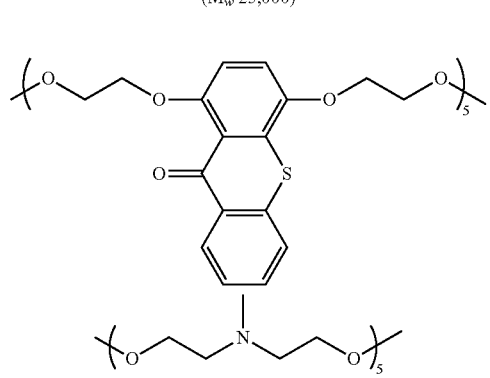

$M_w$ 24,000

<(Component C) Organic Solvent>

The organic solvents used in the Examples are shown below.

2-Pyrrolidone (manufactured by Sigma-Aldrich Japan K.K.)

2-Methylpropanediol (manufactured by Sigma-Aldrich Japan K.K.)

Dipropylene glycol monomethyl ether (manufactured by Sigma-Aldrich Japan K.K.)

Propylene carbonate (manufactured by Wako Pure Chemical Industries, Ltd.)

<Polymer Binder>

The polymer binders used in the Comparative Examples are shown below.

ELVACITE 2013 (manufactured by Lucite International, Inc., a copolymer of methyl methacrylate and n-butyl methacrylate)

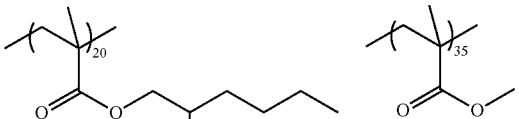

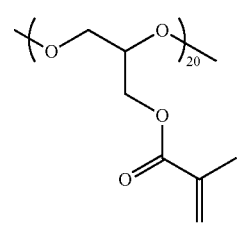

(A-C)
$M_w$26,000

<Other Compounds>

DPGDA (dipropylene glycol diacrylate) (manufactured by UCB S.A.)

IS-7, compound described in JP 2006-28516 A (a polymer having an aromatic ketone site and a tertiary amine site on the core of a dendritic polymer)

This compound was synthesized with reference to the method described in paragraph of JP 2006-28516 A.

Meanwhile, among the compounds used in the Examples and Comparative Examples, those compounds without any indication of the manufacturer were synthesized by a known method or by appropriately applying a known method.

Examples 1 to 8 and Comparative Examples 1 to 3

<Preparation of Ink Composition>

The coloring material dispersions A and B thus obtained were used to prepare ink compositions of Examples 1 to 8 and Comparative Examples 1 to 3 having the compositions indicated in the following table, by stirring for 10 minutes at 2,500 rotations/minute using a mixer (L4R manufactured by Silverson Machines, Ltd.). The ink compositions thus obtained were respectively filled in a disposable syringe made of plastic and was filtered through a polyvinylidene fluoride (PVDF) filter having a pore size of 5 μm (Millex-SV manufactured by Millipore Inc., diameter 25 mm). Thus, complete inks were obtained. The numerical values for the amount of incorporation shown in the following table represent parts by mass.

Furthermore, the viscosities of the ink compositions were measured using VISCOMATE VM-10A-L (manufactured by CBC Materials Co., Ltd.) under the conditions of 25° C. The viscosities of Examples 1 to 8 were 8 mPa·s to 17 mPa·s.

<Image Recording Method>

Next, a commercially available inkjet printer (SP-300V manufactured by Roland DG Corp.) was provided as an inkjet recording apparatus.

Each of the ink compositions thus obtained was loaded in the inkjet printer, and images were formed on polyvinyl chloride sheets (manufactured by Avery Dennison Corp., AVERY 400 GLOSS WHITE PERMANENT).

Next, irradiation of ultraviolet light was carried out using a light-emitting diode (UV-LED, NC4U134 manufactured by Nichia Corp.). The LED is a device outputting ultraviolet light having a wavelength of 365 nm from one chip. The illuminance at the surface was set to 1,000 mW/cm² by controlling the amount of current (focusing light using a lens), and the exposure time (sec) was adjusted so as to obtain an exposure energy of 700 mJ/cm².

The following evaluations were carried out using each of the ink compositions and print materials thus obtained. The evaluation results are shown below.

<Evaluation of Adhesiveness (Cross Hatch Test)>

As a method for evaluating the adhesiveness to base materials, a cross hatch test (JIS K 5600-5-6) was carried out.

A: No change in the image was recognized even after rubbing 10 or more times.
B: The image density was decreased after rubbing 5 to 9 times.
C: The image density was decreased after rubbing 2 to 4 times.
D: The image density was markedly decreased after rubbing once only.

TABLE 1

| | | | Ex. 1 | Ex. 2 | Ex. 3 | Ex. 4 | Ex. 5 | Ex. 6 | Ex. 7 | Ex. 8 | Comp. Ex. 1 | Comp. Ex. 2 | Comp. Ex. 3 |
|---|---|---|---|---|---|---|---|---|---|---|---|---|---|
| Ink composition | Component A | A-1 | 10 | — | — | — | — | — | — | — | — | — | — |
| | | A-2 | — | 10 | — | — | — | — | — | — | — | — | — |
| | | A-3 | — | — | 10 | — | — | — | — | — | — | — | — |
| | | A-4 | — | — | — | 10 | — | 10 | 35 | 10 | — | — | — |
| | | A-5 | — | — | — | — | 10 | — | — | — | — | — | — |
| | Component B | Coloring material dispersion A | 15 | 15 | — | — | — | — | — | — | 15 | — | — |
| | | Coloring material dispersion B | — | — | 15 | 15 | 15 | 15 | 15 | 15 | — | 15 | 15 |
| | Component C | 2-Pyrrolidone | — | — | 15 | 15 | 15 | 15 | 10 | 15 | — | 15 | 15 |
| | | 2-Methylpropanediol | — | — | 5 | 5 | 5 | 5 | 5 | 5 | — | 5 | 5 |
| | | Dipropylene glycol monomethyl ether | 30 | 30 | — | — | — | — | — | — | 30 | — | — |
| | | Propylene carbonate | 45 | 45 | — | — | — | — | — | — | 45 | — | — |
| | Component D | Distilled water | — | — | 55 | 55 | 55 | 55 | 35 | 55 | — | 55 | 55 |
| | Polymer binder | A-C | — | — | — | — | — | — | — | — | — | 10 | — |
| | | ELVACITE 2013 | — | — | — | — | — | — | — | — | 10 | — | — |
| | Other compounds | IS-7 in JP2006-28516A | — | — | — | — | — | — | — | — | — | — | 3 |
| | | DPGDA | — | — | — | — | — | — | — | — | — | — | 7 |
| Evaluation | | Adhesiveness | 1 | 0 | 0 | 0 | 1 | 0 | 0 | 0 | 3 | 4 | 3 |
| | | Water resistance | A | A | A | A | B | A | A | A | B | D | C |
| | | Solvent resistance | A | A | A | A | A | A | A | A | D | B | B |

* Symbol "—" indicates that the composition does not contain the relevant component.
* The numerical values for the ink composition in the table represent the amount added (parts by mass).

According to the image recording method described above, solid images were drawn, in which the average film thickness of the image area was 12 μm.

Thereafter, a cross hatch test was carried out for each of the print materials. Meanwhile, the evaluation was carried out based on six grades from 0 to 5, according to JIS K5600-5-6. Here, grade 0 means that the periphery of the cut was complete and smooth, so that no lattice grids were peeled off. Meanwhile, grade 0 to grade 3 represent levels without any problem in practical use.

<Evaluation of Water Resistance>

Solid images having an average thickness of 12 μm were drawn according to the image recording method described above, and then the print materials were evaluated based on the following criteria by rubbing the surfaces of the print materials with a cotton swab impregnated with distilled water. Moreover, grade A and grade B represent levels without any problem in practical use.

A: No change in the image was recognized even after rubbing 10 or more times.
B: The image density was decreased after rubbing 5 to 9 times.
C: The image density was decreased after rubbing 2 to 4 times.
D: The image density was markedly decreased after rubbing once only.

<Evaluation of Solvent Resistance>

Solid images having an average thickness of 12 μm were drawn according to the image recording method described above, and then the print materials were evaluated based on the following criteria by rubbing the surfaces of the print materials with a cotton swab impregnated with isopropyl alcohol. Meanwhile, grade A and grade B represent levels without any problem in practical use.

As shown in Table 1, print materials that were excellent in all of water resistance, solvent resistance and adhesiveness could be obtained from the ink compositions according to the present invention. On the contrary, print materials that were excellent in all of water resistance, solvent resistance and adhesiveness could not be obtained from those ink compositions that did not contain the (Component A).

What is claimed is:

1. An ink composition comprising:
   (Component A) a polymer comprising a repeating unit (a1) having at least one of an aromatic ketone structure and an aliphatic 1,2-diketone structure, a repeating unit (a2) having at least one of a tertiary amine structure and a thiol structure, and a repeating unit (a3) having an ethylenically unsaturated double bond,
   (Component B) a coloring material, and
   (Component C) an organic solvent,
   wherein the content of the (Component C) in the ink composition is 40% mass to 90% mass.

2. The ink composition according to claim 1, wherein the repeating unit (a1) of the (Component A) is a repeating unit having an aromatic ketone structure.

3. The ink composition according to claim 1, wherein the repeating unit (a2) of the (Component A) is a repeating unit having a tertiary amine structure.

4. The ink composition according to claim 1, wherein the repeating unit (a3) of the (Component A) is a repeating unit having a (meth)acryloyloxy group and/or a (meth)acrylamide group.

5. The ink composition according to claim 1, for use in inkjet recording.

6. An image forming method comprising applying the ink composition according to claim 1 onto a recording medium, and irradiating the applied ink composition with an active energy radiation.

7. The image forming method according to claim 6, wherein the applying of the ink composition is carried out by applying the ink composition by an inkjet method.

\* \* \* \* \*